(12) United States Patent
Hirai et al.

(10) Patent No.: US 7,697,395 B2
(45) Date of Patent: Apr. 13, 2010

(54) OPTICAL DEVICE, METHOD OF PRODUCING THE SAME, OPTICAL PICKUP, AND OPTICAL INFORMATION PROCESSING DEVICE

(75) Inventors: Hideaki Hirai, Kanagawa (JP); Kazuhiro Umeki, Iwate (JP)

(73) Assignees: Ricoh Company, Ltd., Tokyo (JP); Ricoh Optical Industries Co., Ltd., Iwate (JP)

( * ) Notice: Subject to any disclaimer, the term of this patent is extended or adjusted under 35 U.S.C. 154(b) by 1035 days.

(21) Appl. No.: 11/068,348

(22) Filed: Mar. 1, 2005

(65) Prior Publication Data

US 2005/0195485 A1    Sep. 8, 2005

(30) Foreign Application Priority Data

Mar. 4, 2004  (JP) .............................. 2004-060748
Oct. 25, 2004  (JP) .............................. 2004-309361

(51) Int. Cl.
*G11B 7/135*  (2006.01)

(52) U.S. Cl. .............................. 369/112.05; 369/112.16

(58) Field of Classification Search ................. 359/569, 359/486; 264/1.31; 369/112.03
See application file for complete search history.

(56) References Cited

U.S. PATENT DOCUMENTS

| | | | |
|---|---|---|---|
| 5,368,908 A | 11/1994 | Ohta et al. | |
| 6,545,958 B1 | 4/2003 | Hirai et al. | |
| 6,660,986 B2 * | 12/2003 | Matsumoto et al. | 250/201.5 |
| 6,735,157 B2 | 5/2004 | Hirai et al. | |
| 6,760,295 B1 * | 7/2004 | Maruyama | 369/112.05 |

(Continued)

FOREIGN PATENT DOCUMENTS

| | | |
|---|---|---|
| JP | 3077156 | 6/2000 |
| JP | 3382600 | 12/2002 |

OTHER PUBLICATIONS

Hisao Kikuta, Koichi Iwata, "Structural complex refractive index and its applications to optical devices", in "introduction to Diffraction Optical Devices", under the editorship of Physical Society of Applied Physics, Optical Society of Japan, Optical Design Group, Optronics Co., May 20, 1997, first edition, first copy, pp. 158.

(Continued)

*Primary Examiner*—Peter Vincent Agustin
*Assistant Examiner*—Aneeta Yodichkas
(74) *Attorney, Agent, or Firm*—Dickstein Shapiro LLP

(57) ABSTRACT

An optical device having a sub-wavelength grating formed in a specified region is disclosed that is able to prevent wave front degradation accompanying a phase difference of a polarized light beam passing through the optical device. The optical device includes a circular-belt-like region where the sub-wavelength diffraction grating is formed, and a center portion where the sub-wavelength diffraction grating is not formed. A vertically polarized light beam used for operations on a blue-light optical recording medium A has a phase difference in the sub-wavelength diffraction grating to be an integral multiple of $2\pi$ and hence is transmitted through the sub-wavelength diffraction grating. A horizontally polarized light beam used for operations on a blue-light optical recording medium is diffracted by the sub-wavelength diffraction grating. The light path length L1 of the light beam passing through the circular-belt-like region is the same as that of the light beam passing through the center portion without the sub-wavelength grating.

17 Claims, 21 Drawing Sheets

U.S. PATENT DOCUMENTS

| | | | |
|---|---|---|---|
| 6,813,077 B2 * | 11/2004 | Borrelli et al. | 359/486 |
| 6,947,215 B2 * | 9/2005 | Hoshi | 359/576 |
| 6,982,773 B2 * | 1/2006 | Kurtz et al. | 349/117 |
| 7,304,719 B2 * | 12/2007 | Albert et al. | 355/71 |
| 2002/0093902 A1 | 7/2002 | Hirai et al. | |
| 2002/0191502 A1 | 12/2002 | Hirai | |
| 2003/0072247 A1 | 4/2003 | Hirai | |
| 2003/0227859 A1 | 12/2003 | Hirai | |
| 2004/0169924 A1 * | 9/2004 | Flagello et al. | 359/486 |
| 2005/0025026 A1 | 2/2005 | Hirai | |
| 2005/0025028 A1 | 2/2005 | Hirai et al. | |
| 2005/0122879 A1 | 6/2005 | Hirai et al. | |

OTHER PUBLICATIONS

Hisao Kikuta, Koichi Iwata, "Optical control with a fine grating structure comparable to light wavelength", Optics, vol. 27, pp. 12-17 (1998).

Hisao Kikuta, "Diffraction grating in sub-wavelength region", Oplus E, vol. 21, No. 5 (May 1999), pp. 543-550.

* cited by examiner

VERTICAL POLARIZATION
HORIZONTAL POLARIZATION

EFFECTIVE BEAM DIAMETER

SUB-WAVELENGTH GRATING OF LONG PERIOD

[DISK INSERSION]

CARRIAGE MOVEMENT DIRECTION

OPTICAL DEVICE, METHOD OF PRODUCING THE SAME, OPTICAL PICKUP, AND OPTICAL INFORMATION PROCESSING DEVICE

BACKGROUND OF THE INVENTION

1. Field of the Invention

The present invention relates to an optical device used in an optical pickup for recording, reproducing, or erasing information in an optical recording medium, a method of producing the optical device, an optical product, an optical pickup and an optical information processing device.

2. Description of the Related Art

In the related art, an optical pickup in the present technical field is constituted by assembling many optical parts such as lenses, prisms, wave plates, polarized-light optical devices, and so on. In recent years and continuing, it is required that an optical pickup be able to support not only conventional CDs or DVDs, but also new optical recording media conforming with plural new and old standards, such as large capacity blue-light optical recording media. To meet this requirement, the number of the optical parts may further increase. On the other hand, the size of the optical pick is limited, and cannot be made larger than this limit. In other words, it is necessary to include DVD, or blue light functions into a space having a CD size. Furthermore, it is required to make the optical pickup more compact, when, for example, the optical pickup is installed in a notebook personal computer.

As for the optical parts, such as a prism of a polarized beam splitter, there exist problems of many processing steps and a large space occupied in the arrangement. Specifically, the prism of the polarized beam splitter includes two right-angle glass prisms whose shapes are processed at high precision, and after a wavelength selection film is formed on the slope of one prism, the one prism is combined with the slope of the other prism, forming a cubic structure. Due to this structure, complicated processing steps are required compared to plate elements. In addition, an optical part having such a cubic structure occupies considerable space inside the optical pickup.

As for materials of optical parts, in the related art, a ¼ wave plate is made from a quartz crystal, which is an optical crystal, or from a liquid crystal. However, when using the quartz crystal, because it is necessary to process the optical crystal with the primary axis of the crystal being in a specified direction, and direction precision is also required when assembling the optical pickup, there is a negative effect on cost reduction. When using the liquid crystal, the liquid crystal has to be sealed by using two glass substrates, and this also causes increased cost.

Therefore, it is desired that by integrating plural optical parts into an optical device, an optical device can be made compact and be assembled simply, and the cost of the optical device can be further reduced without using an evaporation film or an optical crystal, which are fabricated in each conventional optical part.

Along with recent progress in processing techniques, it becomes possible to fabricate a grating structure having a pitch comparable with the light wavelength or even shorter. In such a sub-wavelength grating structure, although a diffracted wave is not generated, the transmittance properties strongly depend on the fine structure, and it is possible to control a phase speed (effective refractive index), or properties of polarized light by controlling the fine structure. For example, this technique is described in the following references.

1. Hisao Kikuta, Koichi Iwata, "Structural complex refractive index and its applications to optical devices", in "Introduction to Diffraction Optical Devices", under the editorship of Physical Society of Applied Physics, Optical Society of Japan, Optical Design Group, Optronics Co., May 20, 1997, first edition, first copy, pp 158.
2. Hisao Kikuta, Koichi Iwata, "Optical control with a fine grating structure comparable to light wavelength", Optics, Vol 27, pp. 12-17 (1998).
3. Hisao Kikuta, "Diffraction grating in sub-wavelength region", Oplus E, Vol. 21, No. 5 (May, 1999) pp. 543-550.
4. Japanese Patent Gazette No. 3077156.
5. Japanese Patent Gazette No. 3382600.

By using the grating structure in the sub-wavelength region, for example, it is not necessary to perform surface coating of prisms of a polarized beam splitter, and the structure can be made into a plate. Similarly, because the phase speed can be controlled, it is possible to produce a ¼ wave plate by a grating structure.

FIG. 24 is a schematic view of a polarized light selective diffraction device using the sub-wavelength grating in the related art.

In FIG. 24, rectangular gratings having fine pitches are arranged periodically at intervals longer than the wavelength of incident light. If a phase difference between the light passing through the rectangular gratings of fine pitches and the light passing through regions other than the rectangular gratings is an integral multiple of $2\pi$, the incident light is not diffracted and the incident light beam is totally transmitted through the diffraction device. While, if the phase difference is an integral multiple of $\pi$, all of the incident light is diffracted, and there is no light directly passing through the diffraction device. By appropriately selecting the equivalent refractive indexes and heights of the rectangular gratings of fine pitches, it is possible to separate the incident polarized light with light diffraction. In addition, diffraction direction can be controlled by the shape of the grating of pitches longer than the light wavelength.

FIG. 25 is a schematic view of a wave plate using the sub-wavelength grating in the related art.

In FIG. 25, a phase difference is obtainable from anisotropy generated by the sub-wavelength grating, and since this phase difference can be set to be $\pi$ or $\pi/2$, various kinds of wave plates can be realized.

Further, while the sub-wavelength grating is formed in the whole region of the optical device in the related art, in an optical pickup of the present invention, the sub-wavelength grating is formed only in a specified limited region to constitute various kinds of optical elements.

However, when the sub-wavelength grating is formed only in a limited region, a light path length difference, and in turn, a phase difference is generated between the region where the sub-wavelength grating is formed and the region where the sub-wavelength grating is not formed; due to this, a wave front aberration is generated, and this degrades the light condensing properties of the object lens.

FIG. 26A is schematic view illustrating light paths in the sub-wavelength grating and in the region without the sub-wavelength grating in the related art.

As shown in FIG. 26A, the sub-wavelength grating is formed only in a specified region. If the heights of the sub-wavelength grating and the region without the sub-wavelength grating are not appropriately selected, the light path in the sub-wavelength grating is different from the light path in the region without the sub-wavelength grating.

The light path difference Δnd can be expressed by $$\Delta nd = (1+ns)*d/2 - n1*d$$

where ns represents a refractive index in a vertical polarization direction, and n1 represents a refractive index of the sub-wavelength grating region.

This light path difference Δnd generates a phase difference between the sub-wavelength grating region and the region without the sub-wavelength grating.

FIG. 26B illustrates an aberration caused by the phase difference in the related art.

As illustrated in FIG. 26B, due to the light path difference between the sub-wavelength grating region and the region without the sub-wavelength grating, and in turn the phase difference between the sub-wavelength grating region and the region without the sub-wavelength grating, a wave front aberration is generated, and this degrades the light condensing properties of the object lens.

SUMMARY OF THE INVENTION

It is a general object of the present invention to solve one or more problems of the related art.

A specific object of the present invention is to provide an optical device, functioning as an optical part with a sub-wavelength grating being formed in a specified region, able to realize a grating structure so that a transmitting light beam does not suffer from wave front degradation accompanying a phase difference, a method of producing the optical device, an optical product, an optical pickup and an optical information processing device.

According to a first aspect of the present invention, there is provided an optical device comprising a sub-wavelength grating formed in at least one of a plurality of regions, a refractive index, a grating height or a duty ratio of said sub-wavelength grating being selected such that a light path of an incident first light beam in the sub-wavelength grating is the same as a light path of the first light beam in neighboring regions, said first light beam being polarized and having a predetermined polarization direction.

As an embodiment, the sub-wavelength grating may be superposed on a portion of a step-like surface, said surface having a plurality of steps, said portion including at least two steps. Further, the sub-wavelength grating may be superposed on a grating having a period longer than a wavelength of the incident first light beam. Preferably, the sub-wavelength grating may be formed in a circular-belt-like region, or in an inner portion of the circular-belt-like region to diffract an incident second light beam, said second light beam being polarized and having a polarization direction perpendicular to the polarization direction of the first light beam. Alternatively, the sub-wavelength grating may be formed in a circular-belt-like region and in an inner portion of the circular-belt-like region to enable portions of the sub-wavelength grating in the circular-belt-like region and the inner portion of the circular-belt-like region to respectively diffract an incident second light beam to two different directions.

As an embodiment, the sub-wavelength grating may be formed in a plurality of concentric regions, and an incident second light beam has light paths of different lengths at different borders between each adjacent two of the concentric regions. Preferably, the sub-wavelength grating may be formed to have a plurality of concentric portions in an inner portion of a circular-belt-like region capable of diffraction.

As an embodiment, the sub-wavelength grating functions as an m/2 (m is an integer) wave plate. Preferably, the sub-wavelength grating is formed in one of two regions obtained by symmetrically dividing a plane, and the sub-wavelength grating may function as a ½ wave plate relative to the incident second light beam. Alternatively, the sub-wavelength grating may be formed inside a circle including a center portion on a plane, or in a region having a plurality of rectangular slices, and the sub-wavelength grating functions as a ½ wave plate relative to the incident second light beam.

According to a second aspect of the present invention, there is provided a method of producing an optical device having a sub-wavelength grating formed in at least one of a plurality of regions, wherein a light path of an incident light beam having a predetermined polarization direction in the sub-wavelength grating is the same as a light path of the incident light beam in neighboring regions. The method comprises the steps of: fabricating a mold having a fine grating shape on a surface thereof, said fine grating shape being determined by optical design; arranging a light-transmittive and thermal elastic resin on the surface of the mold and heating the resin to a melting temperature; pressing the heated resin on the mold; cooling the resin gradually after the resin is shaped by following the mold for shape transcription; and releasing the resin from the mold.

According to a third aspect of the present invention, there is provided an optical product including an optical device having a sub-wavelength grating, wherein said sub-wavelength grating is formed in at least one of a plurality of regions, and a light path of an incident light beam having a predetermined polarization direction in the sub-wavelength grating is the same as a light path of the incident light beam in neighboring regions, said optical device being produced by a method comprising the steps of: fabricating a mold having a fine grating shape on a surface thereof, said fine grating shape being determined by optical design; arranging a light-transmittive and thermal elastic resin on the surface of the mold and heating the resin to a melting temperature; pressing the heated resin on the mold; cooling the resin gradually after the resin is shaped by following the mold for shape transcription; and releasing the resin from the mold.

According to a fourth aspect of the present invention, there is provided an optical pickup for recording, reproducing or erasing data in at least two optical recording media having numerical apertures of NA1 and NA2 (NA1>NA2), respectively, said optical pickup comprising: an optical device having a sub-wavelength grating, said sub-wavelength grating being formed in a circular-belt-like region, and diffracting an incident second light beam of a polarization direction perpendicular to a predetermined polarization direction of a first light beam, wherein in order to diffract a light beam which is incident only when recording, reproducing or erasing data in the optical recording medium having the numerical aperture of NA2, the circular-belt-like region of the optical device is made to have diffraction functions to condense or scatter the light beam to a position different from a condensing point in an inner portion of the circular-belt-like region.

According to a fifth aspect of the present invention, there is provided an optical pickup for recording, reproducing or erasing data in a first optical recording medium which uses light of a wavelength λ1, has a numerical aperture of NA1, and has a substrate of a thickness t1, said optical pickup comprising: an optical device having a sub-wavelength grating, said sub-wavelength grating being formed in an inner portion of a circular-belt-like region, and diffracting an incident second light beam of a polarization direction perpendicular to a predetermined polarization direction of a first light beam, wherein in order to diffract a light beam which is incident only when recording, reproducing or erasing data in a second optical recording medium which uses light of a wavelength $\lambda 2$ ($\lambda 2 \geqq \lambda 1$), has a numerical aperture of NA2 (NA2$\geqq$NA1), and has a substrate of a thickness t2 (t2$\geqq$t1), the inner portion of the circular-belt-like region of the optical device is made to have diffraction functions to add an aberration having an opposite polarity to an aberration occurring when the light beam is condensed.

According to a sixth aspect of the present invention, there is provided an optical pickup for recording, reproducing or erasing data in a first optical recording medium which uses light of a wavelength $\lambda 1$, has a numerical aperture of NA1, and has a substrate of thickness t1, said optical pickup comprising: an optical device having a sub-wavelength grating, said sub-wavelength grating being formed in a plurality of concentric regions, and an incident second light beam having different light path lengths at different borders between each adjacent two of the concentric regions, said second light beam being polarized and having a polarization direction perpendicular to a predetermined polarization direction of a first light beam, wherein in order to generate different light path lengths of a light beam which is incident only when recording, reproducing or erasing data in a second optical recording medium which uses light of a wavelength $\lambda 2$ ($\lambda 2 \geqq \lambda 1$), has a numerical aperture of NA2 (NA2$\geqq$NA1), and has a substrate of a thickness t2 (t2$\geqq$t1), the concentric region of the optical device is made to have phase-step functions to add an aberration having an opposite polarity to an aberration occurring when the light beam is condensed.

According to a seventh aspect of the present invention, there is provided an optical pickup for condensing light beams from a two-channel array light source to record, reproduce or erase data in an optical recording medium, said optical pickup comprising: an optical device having a sub-wavelength grating, said sub-wavelength grating being formed in one of two regions obtained by symmetrically dividing a plane, and functioning as a ½ wave plate relative to an incident second light beam having a polarization direction perpendicular to a predetermined polarization direction of a first light beam, wherein the two light beams output from the two-channel array light source are incident on the optical recording medium with the polarization directions of the two light beams being substantially perpendicular to each other.

According to an eighth aspect of the present invention, there is provided an optical pickup, comprising: an optical device having a sub-wavelength grating, said sub-wavelength grating being formed inside a circle including a center portion on a plane, or in a region having a plurality of rectangular slices, and said sub-wavelength grating functioning as a ½ wave plate relative to a second light beam having a polarization direction perpendicular to a polarization direction of a first light beam; and a polarization filter arranged between the optical device and an object lens, wherein a polarization direction of a light beam incident on the optical device is set to be substantially perpendicular near an optical axis of the light beam, and a portion of a light beam incident on the object lens is filtered by the polarization filter to form a super high resolution beam spot on an optical recording medium.

According to a ninth aspect of the present invention, there is provided an optical information processing device for recording, reproducing or erasing data in an optical recording medium, said optical information processing device comprising: a sub-wavelength grating formed in at least one of a plurality of regions, a refractive index, a grating height or a duty ratio of said sub-wavelength grating being selected such that a light path of an incident first light beam having a predetermined polarization direction in the sub-wavelength grating is the same as a light path of the first incident light beam in neighboring regions.

According to the present invention, in an optical device having polarized light diffraction functions realized by a sub-wavelength grating, and an optical pickup having such an optical device, a phase difference does not occur between a region where the sub-wavelength grating is formed and a region where the sub-wavelength grating is not formed, and due to this, undesirable wave front degradation does not happen. Therefore, it is possible to obtain an optical device having functions of aperture limitation for polarized light selection, aberration correction, phase shifter, or functions of a wave plate, and by incorporating these optical devices, it is possible to obtain an optical pickup of high compatibility, a multi-beam optical pickup, and a super-high resolution optical pickup; and an optical information processing device using these optical pickups.

In addition, according to the present invention, it is possible to obtain an optical device which can be fabricated without a surface coating process, which enables functions of multiple parts to be shared, and enables reduction of the size and the cost.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

In the following embodiments, descriptions are made of compatible devices of an optical pickup for recording, reproducing or erasing data in at least two optical recording media which use light of different wavelengths, substrates of different thickness, and have different numerical apertures; and the sub-wavelength grating functions as a polarized light diffraction device and a polarized light phase shifter.

First Embodiment

Figure 1:
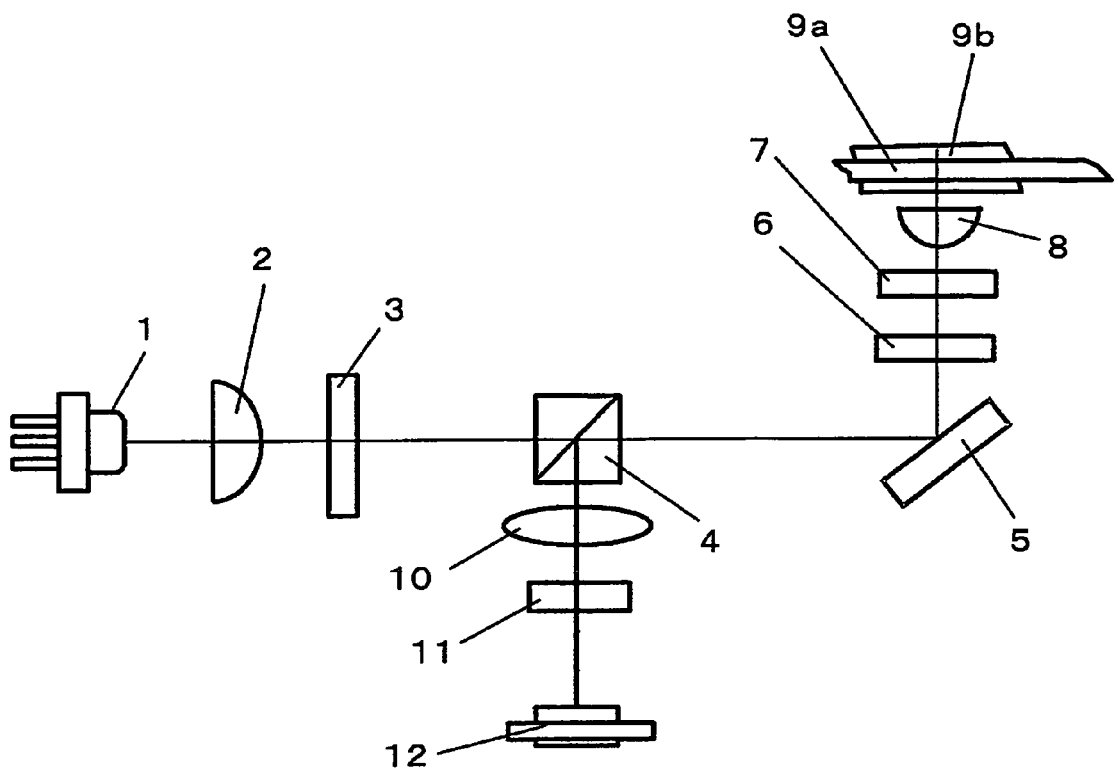
FIG. 1 is a schematic view illustrating an optical pickup according to a first embodiment of the present invention.

FIG. 1 is a schematic view illustrating an optical pickup according to a first embodiment of the present invention.

The optical pickup illustrated in FIG. 1 is used for recording, reproducing or erasing data in an optical recording medium A and an optical recording medium B which use light of different wavelengths, substrates of different thicknesses, and have different numerical apertures. Specifically, the optical recording medium A is a blue light optical recording medium which uses light of a wavelength equaling 405 nm, has a numerical aperture NA 0.85, and has a substrate of thickness equaling 0.1 mm on the incidence side. The optical recording medium B is a blue light optical recording medium, which uses light of a wavelength equaling 405 nm, has a numerical aperture NA 0.65, and has a substrate of thickness equaling 0.6 mm on the incidence side.

A principal portion of the optical pickup illustrated in FIG. 1 includes a semiconductor laser 1 emitting a light beam of wavelength of 405 nm, a collimator lens 2, a polarization plane switching element 3, a half mirror 4, a deflection prism 5, a polarized light selective aperture limitation element 6, a polarized light selective aberration correction element 7, an object lens 8, a detection lens 10, a light beam divider 11, and a light receiving element 12.

The object lens 8 is designed such that for a light beam incident on the blue light optical recording medium A 9a (wavelength: 405 nm, numerical aperture: NA=0.85, substrate thickness on the incidence side: 0.1 mm) in parallel, the wave front aberration is a minimum. A parallel incidence system is also referred to as "infinite incidence system".

Generally, when the numerical aperture NA an object lens is higher, a better tolerance is required. In the present example, compared to the numerical aperture NA 0.65, it is relatively difficult to obtain desired properties with the numerical aperture NA 0.85; hence, it is preferable to use a non-spherical lens of a numerical aperture NA 0.85 with aberration being corrected.

The optical recording medium A 9a and the optical recording medium B 9b have substrates of different thicknesses and use light of different wavelengths. The optical recording medium A 9a is a blue light optical recording medium, which has a substrate of thickness equaling 0.1 mm on the incidence side. The optical recording medium B 9b is a blue light optical recording medium, which has a substrate of thickness equaling 0.6 mm on the incidence side. When recording or reproducing data, one of the optical recording media 9a and 9b is set in a not-illustrated rotational mechanism and is rotated at high speed.

Below, a description is made of operations of recording or reproducing data in the optical recording medium 9a, that is, the blue light optical recording medium A related to a wavelength of 405 nm, numerical aperture NA 0.85, and a substrate thickness of 0.1 mm on the incidence side.

A linearly-polarized and divergent light beam having a wavelength of 405 nm is emitted from the semiconductor laser 1. This linearly-polarized and divergent light beam is converted into a substantially parallel beam in the collimator lens 2. In the polarization plane switching element 3, the polarization direction of the light beam is rotated by 90 degrees in a plane perpendicular to the paper. Assume that the polarization direction of the light beam after rotation is perpendicular to the polarization direction of the incident light beam. The thus obtained light beam passes through the half mirror 4, and the light path of the light beam is deflected by 90 degrees in the deflection prism 5. Then, the light beam passes through non-sensitive regions of the polarized light selective aperture limitation element 6 and the polarized light selective aberration correction element 7, is incident on the object lens 8, and is condensed on the optical recording medium 9a to be a fine spot. With this spot, data recording, reproduction, or erasure in the optical recording medium 9a is performed.

The light beam reflected from the optical recording medium 9a is converted into substantially a parallel light beam again, and is reflected by the half mirror 4. The reflected light beam is focused to be a focused light beam by the detection lens 10, divided into plural divisional light beams in the light beam divider 11 along different light paths, and arrives at the light receiving element 12. The light receiving element 12 outputs information signals and servo signals.

Next, a description is made of operations of recording or reproducing data in the optical recording medium 9b, that is, the blue light optical recording medium B having a wavelength of 405 nm, numerical aperture NA 0.65, and a substrate thickness of 0.6 mm on the incidence side.

A linearly-polarized and divergent light beam having a wavelength of 405 nm is emitted from the semiconductor laser 1. This linearly-polarized and divergent light beam is converted into a substantially parallel beam in the collimator lens 2. In the polarization plane switching element 3, the polarization direction of the light beam is not rotated and passes through with the polarization direction of the light beam being the same as the polarization direction of the incident light beam. The thus obtained light beam passes through the half mirror 4, and the light path of the light beam is deflected by 90 degrees in the deflection prism 5.

Then, the numerical aperture NA the light beam is limited to be 0.65 in the polarized light selective aperture limitation element 6, and is diffracted in the polarized light selective aberration correction element 7. This light beam is incident on the object lens 8 with certain divergence, and is condensed on the optical recording medium 9b as a fine spot. With this spot, data recording, reproduction, or erasure in the optical recording medium 9b is performed.

The light beam reflected from the optical recording medium 9b is converted into a substantially parallel light beam again, and is reflected by the half mirror 4. The reflected light beam is focused to be a focused light beam by the detection lens 10, is divided into plural divisional light beams in the light beam divider 11 along different light paths, and arrives at the light receiving element 12. The light receiving element 12 outputs information signals and servo signals.

The polarization plane switching element 3 may be formed from a Twisted Nematic liquid crystal. As is well known, when a voltage is applied on the Twisted Nematic liquid crystal, the polarization direction of the incident light beam is rotated by 90 degrees, and when the voltage is not applied, the polarization direction of the incident light beam passes without any change.

Next, a description is made of a relationship between the numerical aperture (NA) and the diameter of the light beam. In the present embodiment, it is necessary to change the numerical aperture (NA) according to the object light optical recording medium. Specifically, while the blue light optical recording medium A 9a has a numerical aperture NA 0.85, the blue light optical recording medium A 9b has a numerical aperture NA 0.65. The numerical aperture NA can be expressed by the following formula (1), $$NA = \frac{\phi}{2f} \quad (1)$$

where, f represents the focal length of the object lens, and φ represents an effective diameter of the light beam to be focused.

Therefore, in order to change the numerical aperture (NA) corresponding to the object light optical recording medium, it is sufficient to provide a unit to change the numerical aperture (NA) according to the object light optical recording medium. For this purpose, the polarization plane switching element 3 and the polarized light selective aperture limitation element 6 are provided. The former is used to change the polarization direction of the light beam output from the light source according to the object light optical recording medium, and the latter has zero-order or first-order diffraction functions according to the polarization direction of the incident light beam.

Figure 24:
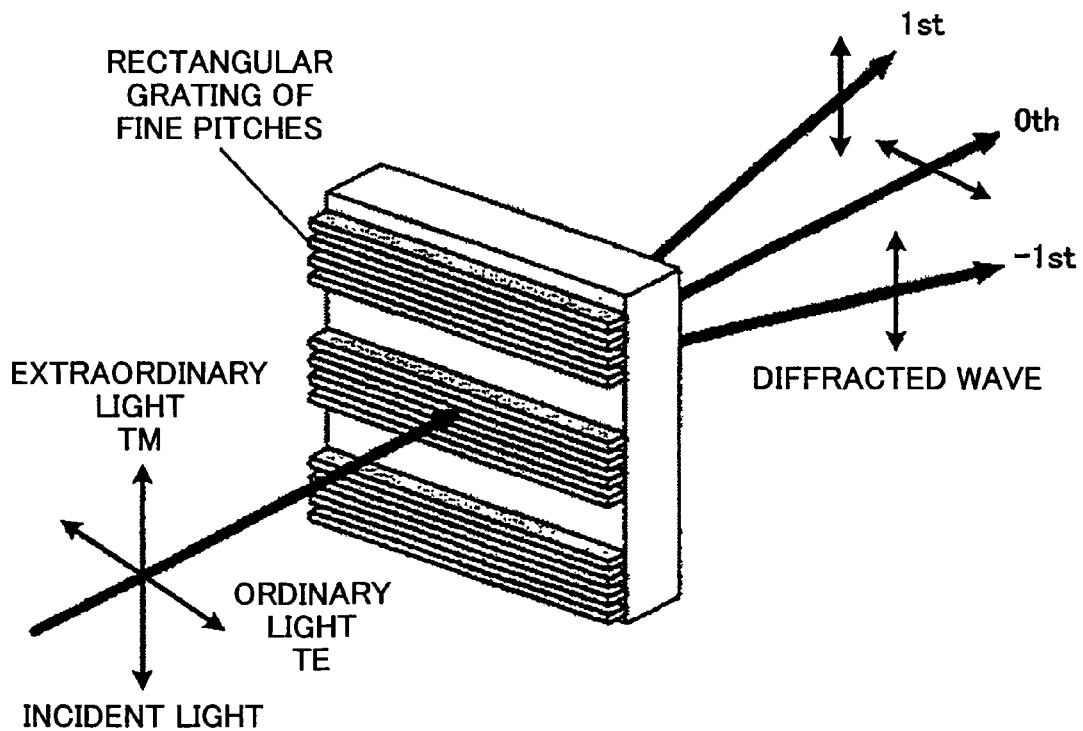
FIG. 24 is a schematic view of a polarized light selective diffraction device using the sub-wavelength grating in the related art.
Figure 25:
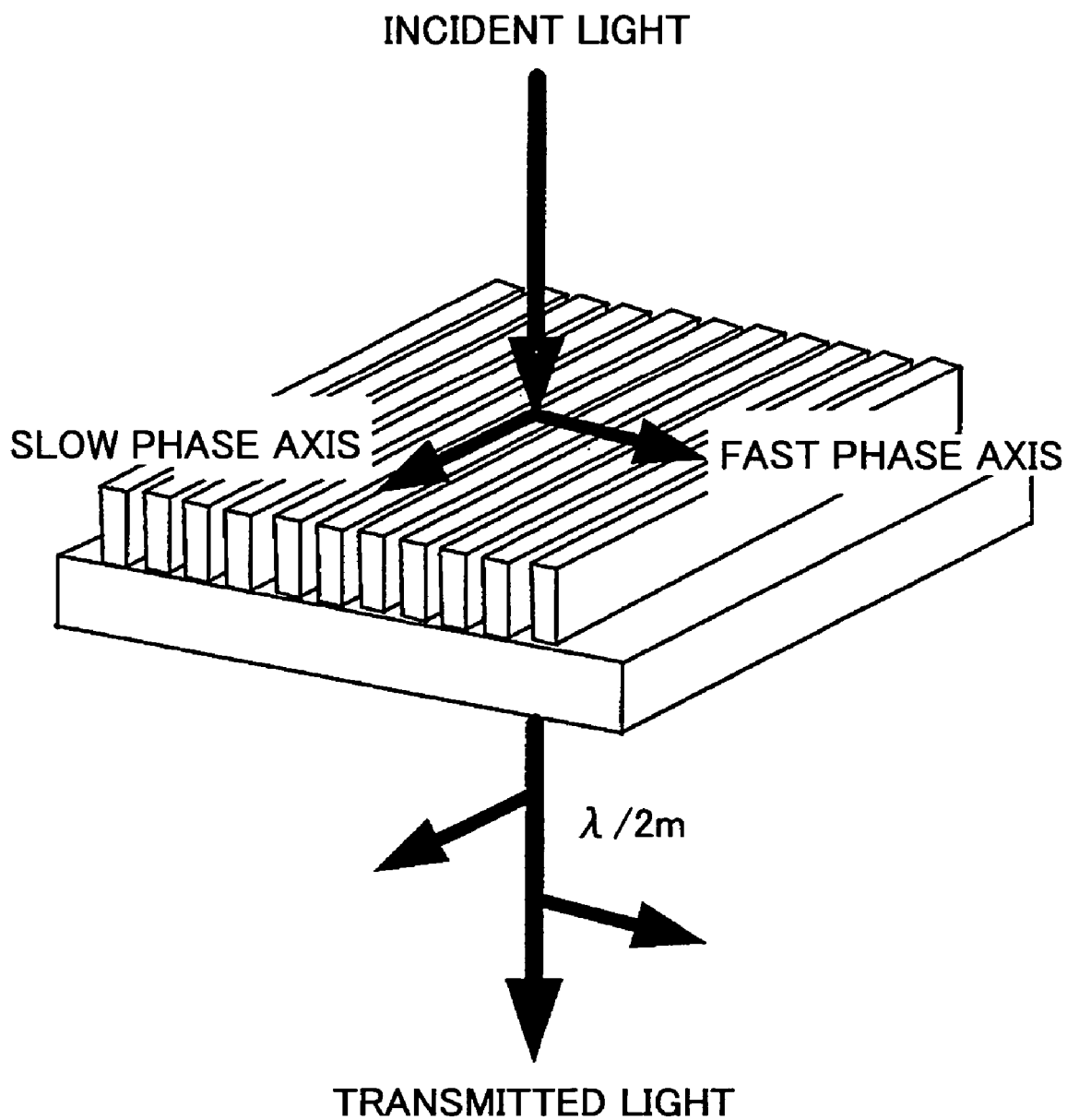
FIG. 25 is a schematic view of a wave plate using the sub-wavelength grating in the related art.
Figure 26A:
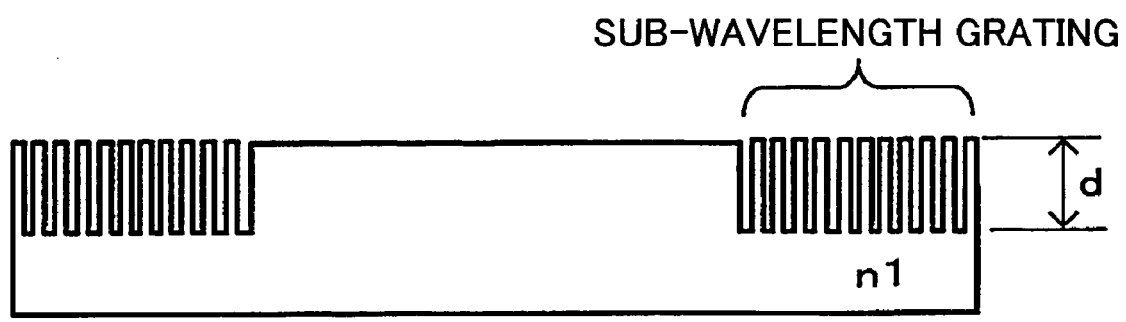
FIG. 26A is schematic view illustrating light paths in the sub-wavelength grating and in the region without the sub-wavelength grating in the related art.
Figure 26B:
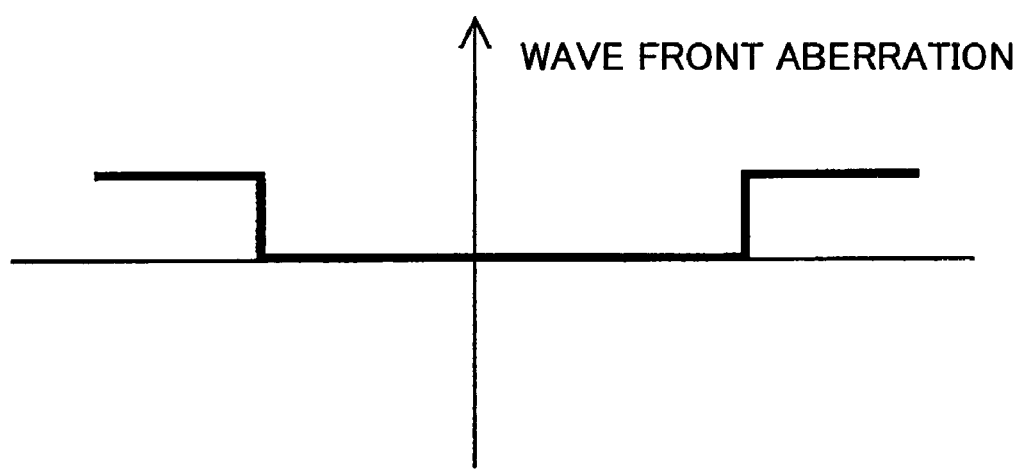
FIG. 26B illustrates an aberration caused by the phase difference in the related art.

In diffraction of polarized light for aperture limitation, by using the polarized light selective aperture limitation element having a sub-wavelength grating, as illustrated in FIG. 24, if the equivalent refractive index of a portion of a rectangular grating having fine pitches and the height of the grating are appropriately selected, it is possible to separate the polarized light by light diffraction. In addition, the direction of diffraction can be controlled by the shape of the grating having pitches longer than the light wavelength of the incident light beam.

Next, a description is made of the conditions under which a phase difference does not occur between a light beam having a predetermined polarization direction through a region where the sub-wavelength grating is formed and the light beam through a region where the sub-wavelength grating is not formed in an optical device.

The sub-wavelength grating has a complex refractive index which depends on whether the polarization direction of the incident light is parallel or perpendicular to a channel direction of the grating.

The refractive index of a portion having a periodic structure, specifically, an np component in a horizontal polarization direction of the incident light beam and an ns component in a perpendicular polarization direction of the incident light beam, can be expressed by the following formulae (2) and (3).

$$np = \sqrt{t(n1)^2 + (1-t)(n2)^2} \quad (2)$$

$$ns = \frac{1}{\sqrt{\frac{t}{(n1)^2} + \frac{1-t}{(n2)^2}}} \quad (3)$$

where, n1, n2 represent the refractive indexes of materials at tops and bottoms in the grating periodic structure, and t represents a duty ratio.

If n2 is set to be 1 (that is, refractive index of air), and the duty ratio t is set to be 0.5, the np component and the ns component can be expressed by the following formulae (4) and (5).

$$np = \sqrt{\frac{(n1)^2}{2} + \frac{1}{2}} \quad (4)$$

$$ns = \frac{1}{\sqrt{\frac{1}{2(n1)^2} + \frac{1}{2}}} \quad (5)$$

For example, for the incident light beam having a perpendicular polarization direction, in order to obtain a non-sensitive region (that is, the phase difference δ is an integral multiple of 2π), it is sufficient to satisfy the following formula (6).

$$\delta = \frac{2\pi d1}{\lambda}(ns - 1) = 2m\pi \quad (6)$$

where, λ indicates the wavelength of the incident light beam, d1 represents a height of the grating, and m is an arbitrary integer.

Figure 2:
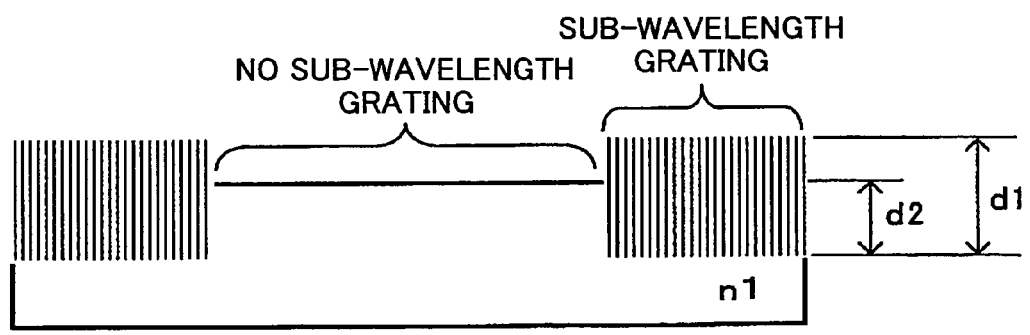
FIG. 2 is schematic view illustrating light paths in the sub-wavelength grating and in the region where the sub-wavelength grating is not formed.

FIG. 2 is schematic view illustrating light paths in the sub-wavelength grating and in the region where the sub-wavelength grating is not formed.

As illustrated in FIG. 2, in order that a phase difference does not occur between a light beam through a region where the sub-wavelength grating is formed and the light beam through a region where the sub-wavelength grating is not formed, it is required that the light path of the incident light beam in the sub-wavelength grating equal the light path of the light beam in neighboring regions where the sub-wavelength grating is not formed.

Therefore, the average light path length L1 of a light beam through the region where the sub-wavelength grating is formed can be expressed by the following formula (7).

$$L1 = (ns+1)\frac{d1}{2} \qquad (7)$$

It is sufficient to set the path length L1 to be the same as the light path length L2 of the light beam through the region where the sub-wavelength grating is not formed.

The light path length L2 is given by the following formula (8), $$L2 = n1d2 \qquad (8)$$

where, n1 represents the refractive index of the region where the sub-wavelength grating is formed, and d2 corresponds to the height of the region where the sub-wavelength grating is not formed.

Next, a description is made of the polarized light selective aperture limitation element 6, which utilizes the function of polarized light selective diffraction for aperture limitation.

Figure 3A:
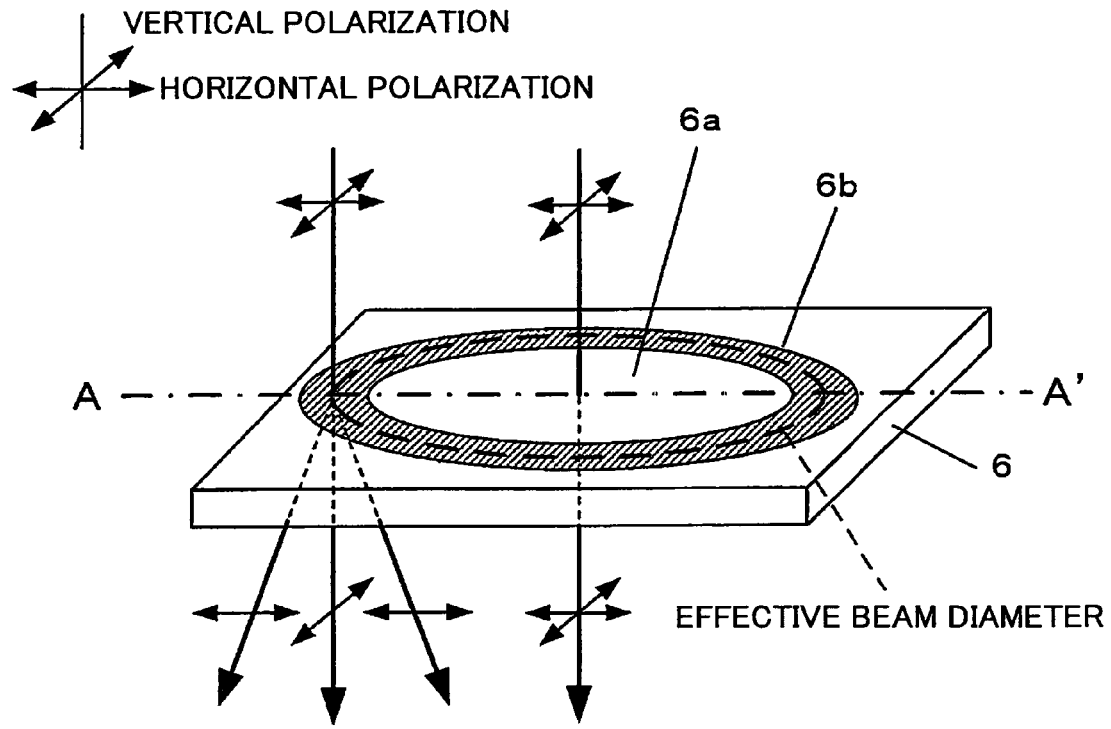
FIG. 3A is a perspective view of an aperture limitation element according to the present embodiment.
Figure 3B:
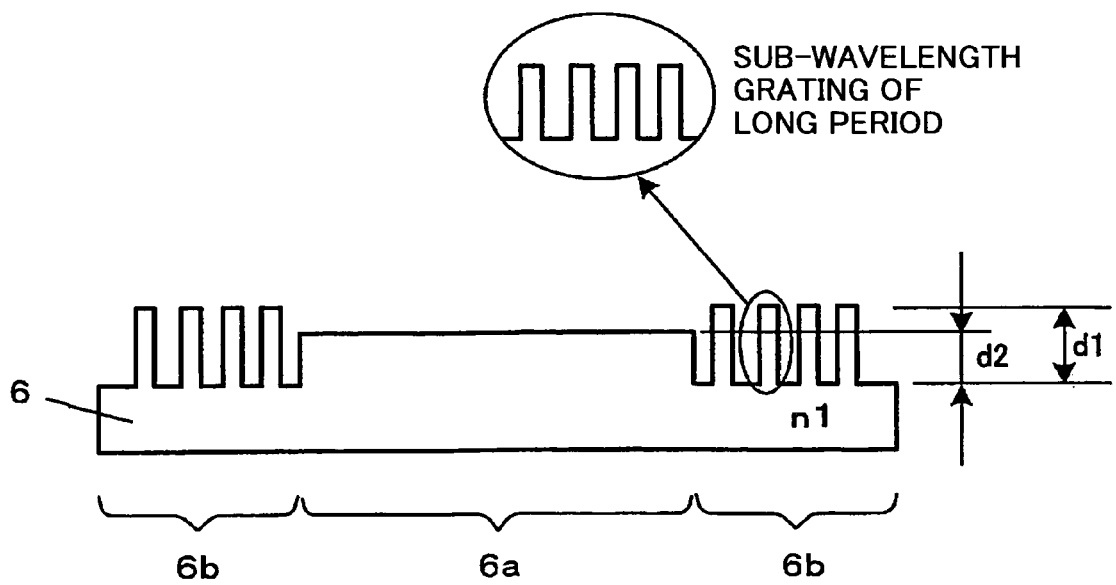
FIG. 3B is a cross-sectional view of the aperture limitation element along the line AA' in FIG. 3A.

FIG. 3A is a perspective view of an aperture limitation element according to the present embodiment, and FIG. 3B is a cross-sectional view of the aperture limitation element along the line AA' in FIG. 3A.

Here, when recording or reproducing data in the blue-light optical recording medium A, a light beam of a vertical polarization direction is incident on and passes through the aperture limitation element 6, and when recording or reproducing data in the blue-light optical recording medium B, a light beam of a horizontal polarization direction is incident on and passes through the aperture limitation element 6.

As illustrated in FIG. 3A, the optical device includes a circular-belt-like (annular) region 6b where a sub-wavelength diffraction grating is formed, and a center portion 6a where a diffraction grating is not formed. At the border line between the center portion 6a and the circular-belt-like region 6b, the numerical aperture NA equals 0.65. The circular-belt-like region 6b is also called an aperture limitation region.

When recording or reproducing data in the blue-light optical recording medium A, it is required that the light beam incident on the aperture limitation element 6 penetrate the circular-belt-like region 6b as zero-order diffraction light. For this purpose, it is sufficient that the phase difference δ generated in the aperture limitation element 6 be an integral multiple of 2π for the vertically polarized incident light beam, that is, the following formula (9) is satisfied, $$\delta = \frac{2\pi d1}{\lambda}(ns-1) = 2m\pi \qquad (9)$$

where d1 represents channel depth of the diffraction grating of the circular-belt-like region 6b, λ indicates the wavelength of the incident light beam, d1 represents the height of the grating, and m is an arbitrary integer.

When recording or reproducing data in the blue-light optical recording medium B, the light beam incident on the aperture limitation element 6 is horizontally polarized and is diffracted.

A diffraction efficiency η1 of a thin phase diffraction grating having a cross section of a rectangular structure, as illustrated in FIG. 3B, can be expressed by the following formula (10), $$\eta 1 = \frac{4}{\pi^2}\sin^2\left(\frac{\Delta n d1}{\lambda}\pi\right) \qquad (10)$$

where Δn represents a complex diffraction index induced by a super fine diffraction grating.

In the present embodiment, when recording or reproducing data in the blue-light optical recording medium A, it is required that the light beam incident on the aperture limitation element 6 pass through a non-sensitive region. For this purpose, the path lengths of the light beam parts passing through the circular-belt-like region 6b and the center portion 6a should be the same. If a difference of the path lengths exists, the light beam passing through may experience a phase difference and generate an aberration. To avoid this problem, the diffraction grating of the circular-belt-like region 6b having pitches longer than the light wavelength has a cross section formed by depressions and projections, and the average light path length L1 of the depressions and projections can be expressed by the following formula (11).

$$L1 = \left(\frac{1+ns}{2}+1\right)\frac{d1}{2} \qquad (11)$$

It is sufficient to set the path length L1 to be the same as the light path length L2 of the light beam part through the center portion 6a where no diffraction grating is formed. The light path length L2 is given by the following formula (12).

$$L2 = n1d2 \qquad (12)$$

The light beam incident on the center portion 6a and the circular-belt-like region 6b is diffracted in the forward path, and is condensed on the optical recording medium 9a. After that, the light beam is diffracted again at a position at which the diffraction grating is axially symmetric relative to the optical axis of the diffraction grating, that is, the position of rotational symmetry.

When the grating pattern of the diffraction grating is axially symmetric relative to the optical axis of the diffraction grating, the light diffracted of positive orders in the forward path is diffracted of negative orders in the returning path, and becomes zero-order light to be superposed on the light moving straightforward. If the superposed light moving straightforward enters the light receiving element, the light, as a Flare component, degrades the signals output from the light receiving element.

Figure 4:
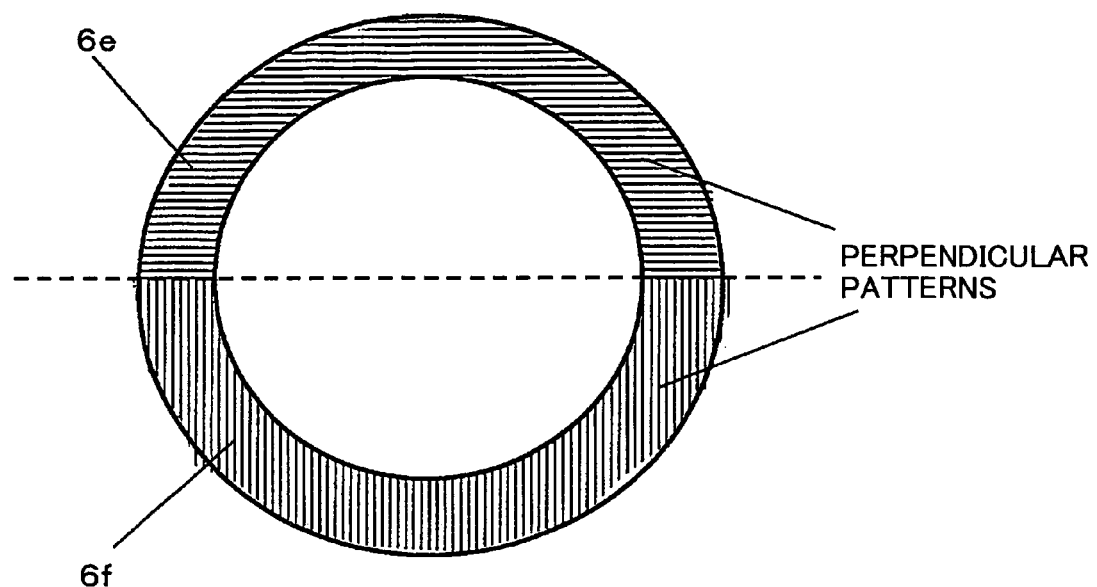
FIG. 4 is a plan view illustrating an example of the sub-wavelength grating according to the present embodiment.

FIG. 4 is a plan view illustrating an example of the sub-wavelength grating according to the present embodiment.

To solve the above mentioned problem, as illustrated in FIG. 4, in the circular-belt-like region 6b, the planar grating pattern of the diffraction grating 6b is divided into two sections 6e and 6f, and the two grating patterns 6e and 6f are perpendicular to each other so as to eliminate the rotational symmetry. With such a structure, the light diffracted of positive (or negative) orders in the forward path, and the light diffracted of negative (or positive) orders in the returning path do not superpose with each other, and this reduces the flare component.

Figure 5:
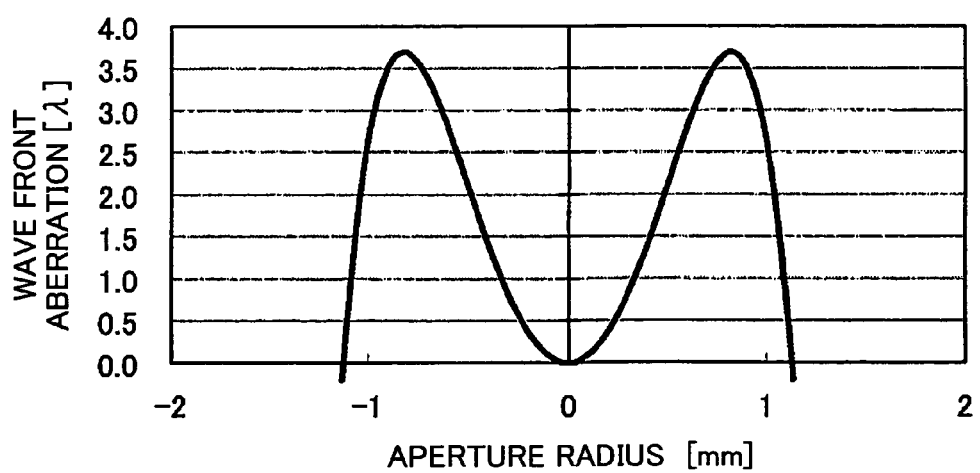
FIG. 5 shows the wave front aberration generated when using the object lens designed for the optical recording medium A for the object lens of the optical recording medium B.

FIG. 5 shows the wave front aberration generated when using the object lens designed for the optical recording medium A 9a as the object lens of the optical recording medium B 9b, where the abscissa indicates the diameter of the incidence aperture, and the ordinate indicates the wave front aberration.

Specifically, the object lens for the blue-light optical recording medium A 9a is of NA=0.85, and is designed to obtain good aberration properties on the blue-light optical recording medium A 9a, which uses light of wavelength 405 nm, and has a substrate of thickness 0.1 mm on the incidence side.

When this object lens is used for the blue-light optical recording medium B 9b using light of wavelength 405 nm and having a substrate of thickness 0.6 mm on the incidence side, with the numerical aperture NA of the object lens being limited to be 0.65, a wave front aberration is generated as illustrated in FIG. 5.

In FIG. 5, a cross section of a two dimensional phase difference distribution is presented, but in practice, the phase difference distribution is a three-dimensional rotational-symmetric one with the vertical axis (NA=0) being the symmetric axis.

In order to correct such an aberration, similar to the aperture limitation technique as described above, the function of polarized light selective diffraction can be used.

Figure 6:
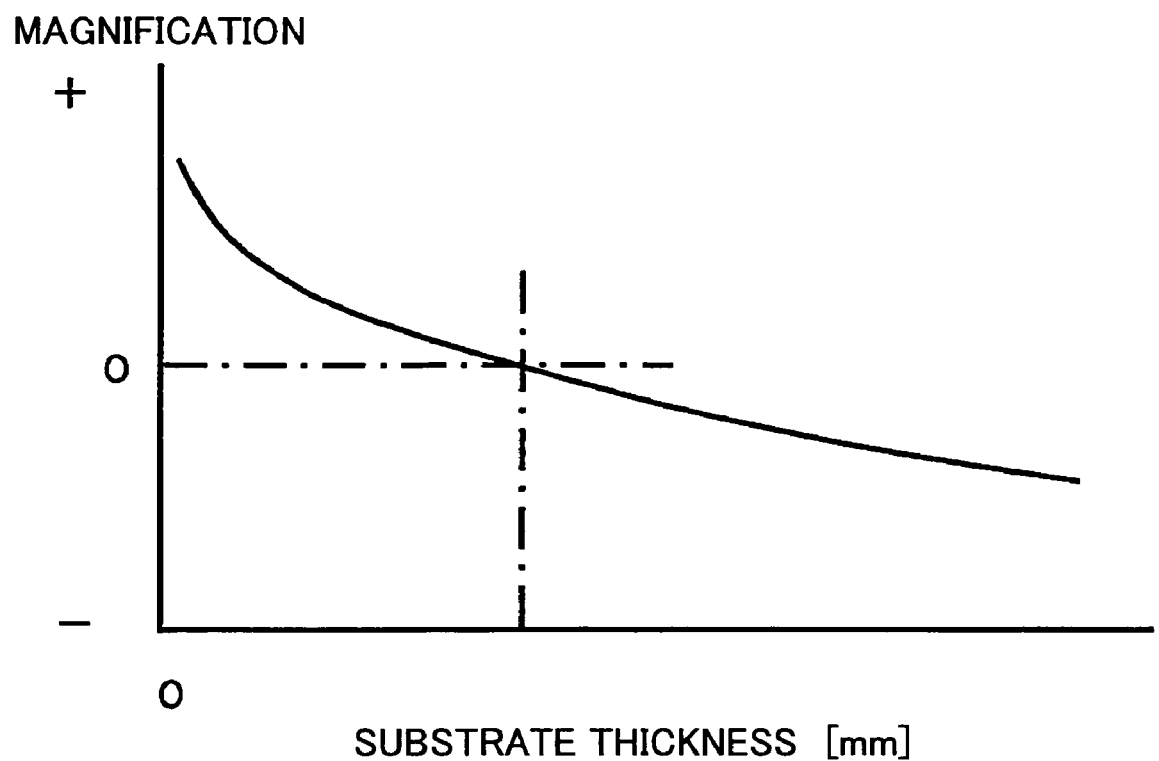
FIG. 6 shows a relation between substrate thickness of an optical recording medium and divergence of a light beam from a common object lens.

FIG. 6 shows a relation between substrate thickness of an optical recording medium and divergence of a light beam from a common object lens, where the abscissa indicates the substrate thickness of the optical recording medium, and the ordinate indicates a magnification of the object lens in usage state, the magnification being a function of the divergence of the light beam incident on the object lens.

Because the light beam being emitted from the object lens to the substrate side is always a focused beam, here a sign "+" is used to indicate incidence of a focused beam into the object lens, and a sign "−" is used to indicate incidence of a divergent beam into the object lens. Particularly, a magnification equaling 0 indicates that a parallel beam is incident into the object lens.

In FIG. 6, each point in the graph corresponds to a magnification resulting in a minimum of the wave front aberration at a given substrate thickness of the optical recording medium. For example, as is well known, if parallel incidence is optimum at a given substrate thickness of the optical recording medium, the thicker the substrate, the more divergent (that is, farther in the − direction) the incident light beam is required to be; the thinner the substrate, the more focused (that is, farther in the + direction) the incident light beam is required to be; and by selecting the incident light beam in this way, the aberration can be reduced. Specifically, in the present embodiment, the object lens is optimized for the blue-light optical recording medium A having a substrate thickness of 0.1 mm, and when the object lens is used for light condensing to the blue-light optical recording medium B 9b having a substrate thickness of 0.6 mm, a divergent incident light beam can be used to reduce the aberration.

Next, a description is made of an aberration correction element utilizing the function of polarized light selective diffraction.

Figure 7A:
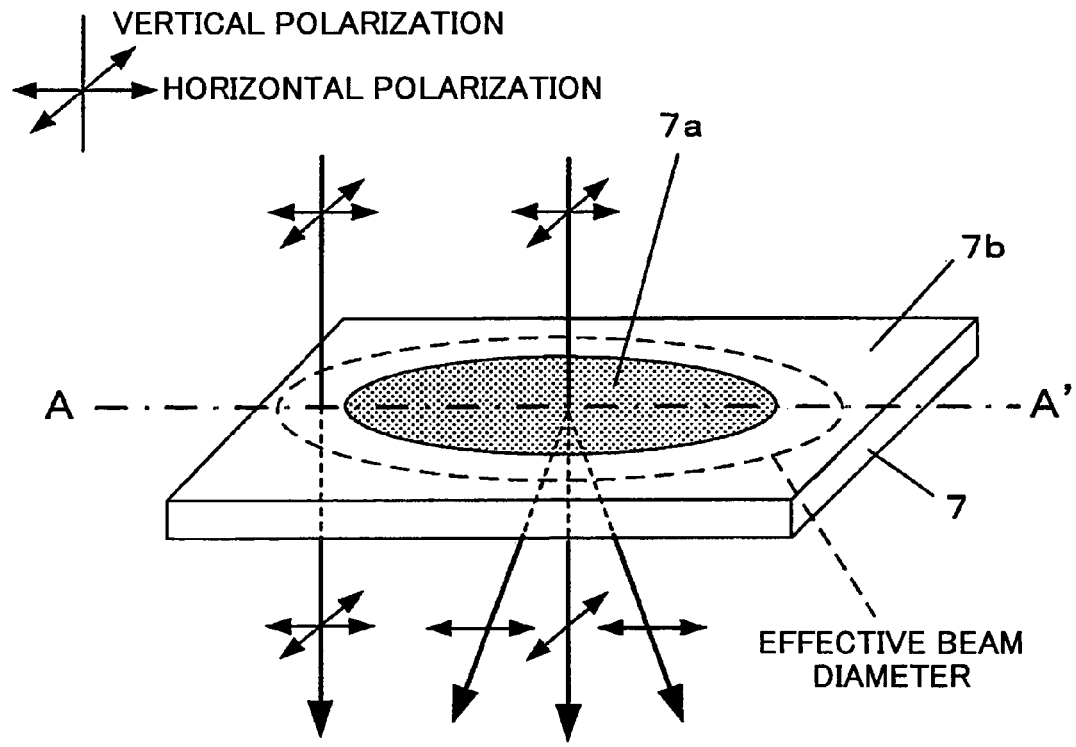
FIG. 7A is a perspective view of an aberration correction element according to the present embodiment.
Figure 7B:
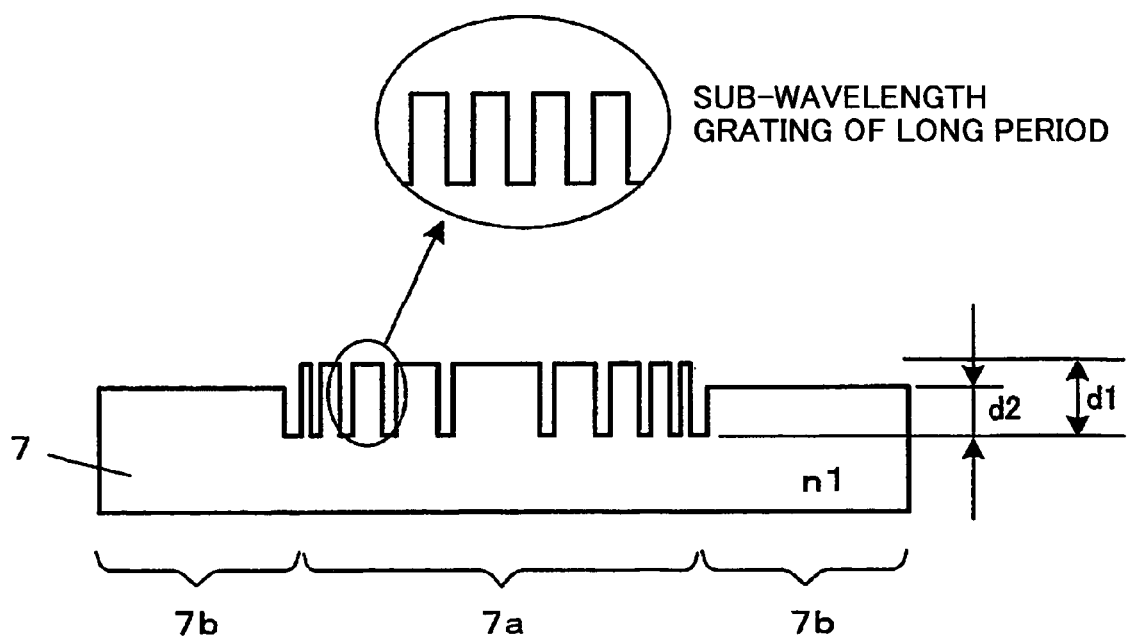
FIG. 7B is a cross-sectional view of the aberration correction element along the line AA' in FIG. 7A.

FIG. 7A is a perspective view of an aberration correction element according to the present embodiment, and FIG. 7B is a cross-sectional view of the aberration correction element along the line AA' in FIG. 7A.

Here, when recording or reproducing data in the blue-light optical recording medium A, a light beam of a vertical polarization direction is incident on and passes through the aberration correction element, and when recording or reproducing data in the blue-light optical recording medium B, a light beam of a horizontal polarization direction is incident on and passes through the aberration correction element.

As illustrated in FIG. 7A, the optical device includes a center portion 7a of a circular-belt-like region, namely, a region on an inner side of the circular-belt-like region, where a diffraction grating is formed, and a peripheral region 7b, where a diffraction grating is not formed. At the border line between the center portion 7a and the peripheral region 7b, the numerical aperture NA is equal to or greater than 0.65.

When recording or reproducing data in the blue-light optical recording medium A, it is required that the light beam passing through the aberration correction element penetrate the center portion 7a as zero-order diffraction light. For this purpose, it is sufficient that the phase difference δ generated in the aberration correction element be an integral multiple of 2π for the vertically polarized incident light beam.

When recording or reproducing data in the blue-light optical recording medium B, an incident light beam is used which has a polarization direction perpendicular to the optical recording medium A. When such a light beam is incident, a phase difference is generated and the incident light beam is diffracted. The planar pattern of the diffraction region may be the well-known zone-plate.

In the present embodiment, the aforesaid aperture limitation element and the aberration correction element may be integrated together. For example, if the aperture limitation function and the aberration correction function are provided on two sides of a plate-shaped optical element, respectively, it is possible to reduce the number of the parts.

Figure 8:
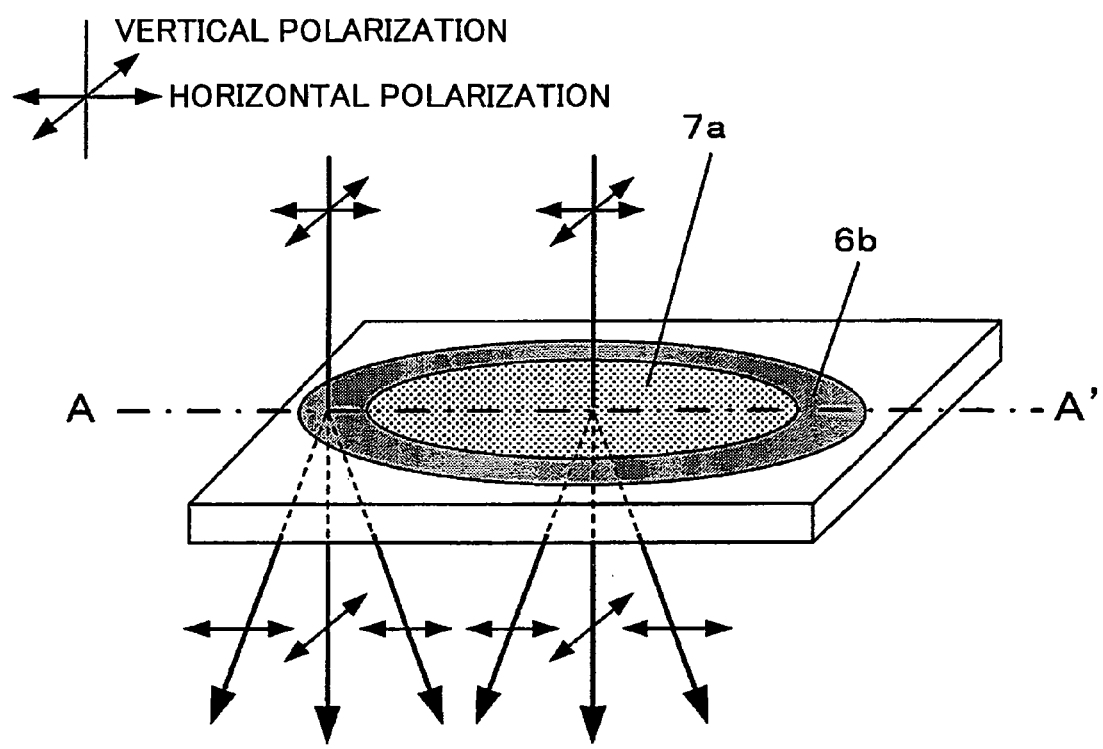
FIG. 8 is a perspective view showing an example of an optical device according to the present embodiment.

FIG. 8 is a perspective view showing an example of an optical device according to the present embodiment.

As illustrated in FIG. 8, in the optical device, a circular-belt-like region 6b having the aperture limitation function and a center portion 7a having the aberration correction function are provided on the same plane.

Next, descriptions are made of methods of producing the above mentioned optical devices according to the present invention.

The method of producing the optical device mentioned above according to the present invention involves using a light-transmittive and thermal elastic resin as the material of the diffraction grating, and transcribing a fine shape formed on a mold for processing the resin. Therefore, it is not necessary to execute time-consuming processes, such as evaporation, as in the related art, and thereby enabling mass production.

FIG. 9A through 9E are cross-sectional views illustrating a process of fabricating a mold according to the present embodiment.

Figure 9A:
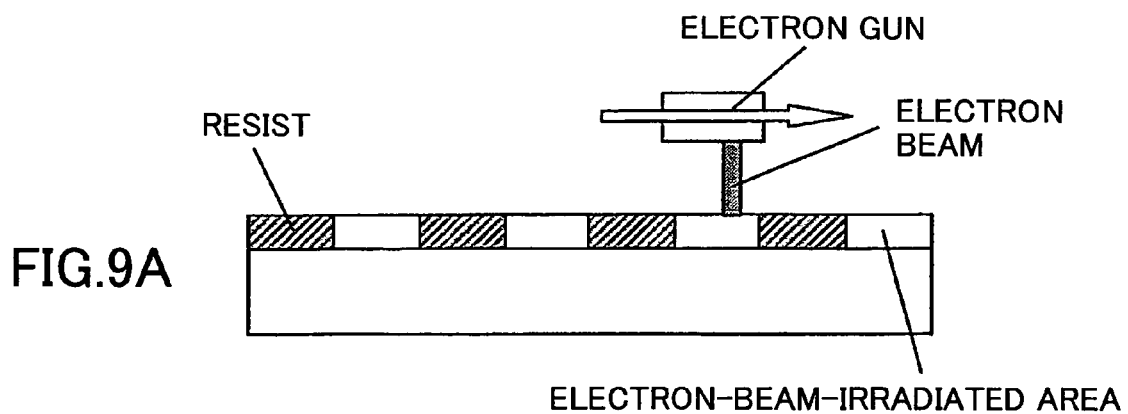
FIG. 9A through 9E are cross-sectional views illustrating a process of fabricating a mold according to the present embodiment.

In the step shown in FIG. 9A, a mold 40 for molding resin is exposed with an electron beam.

Figure 9B:
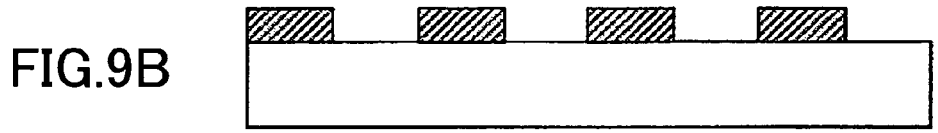

In the step shown in FIG. 9B, the mold 40 is then developed.

Figure 9C:
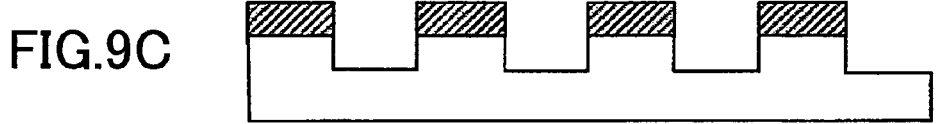

In the step shown in FIG. 9C, reactive ion etching or another is executed on the mold 40.

Figure 9D:
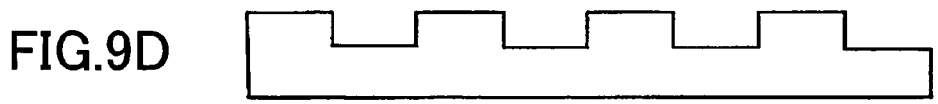

In the step shown in FIG. 9D, due to the reactive ion etching, the mold substrate is dug, forming a prototype mold.

Figure 9E:
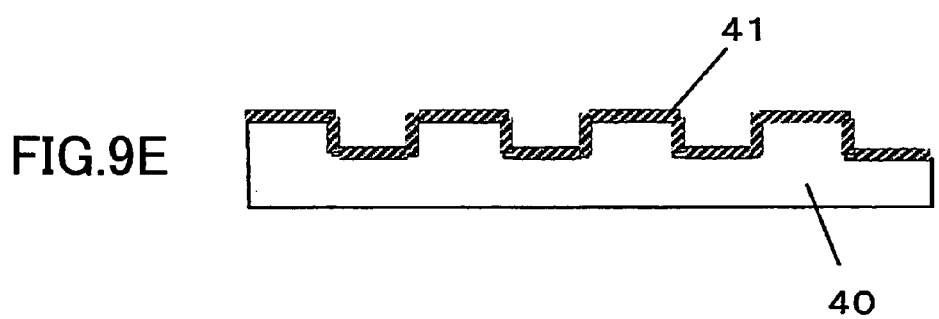

In the step shown in FIG. 9E, a separation material 41 is applied on the prototype mold for separating the mold 40 easily in the following transcription step.

Figure 10A:
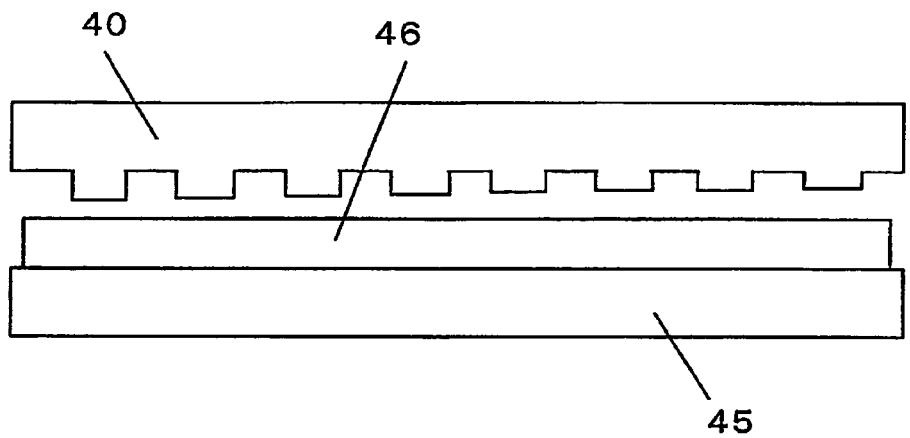
FIG. 10A through 10C are cross-sectional views illustrating a process of transcribing a grating pattern.
Figure 10B:
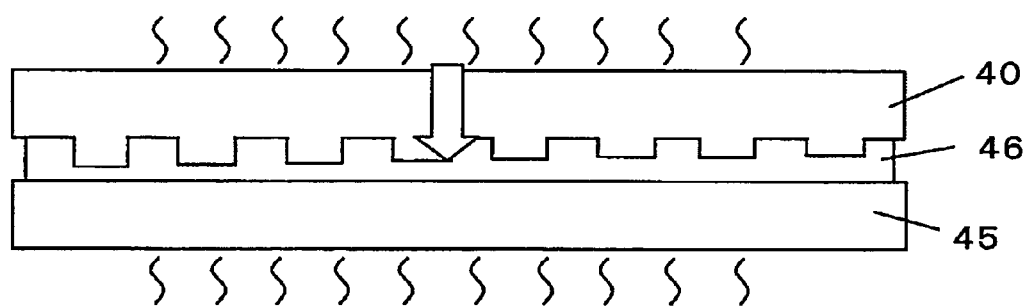
Figure 10C:
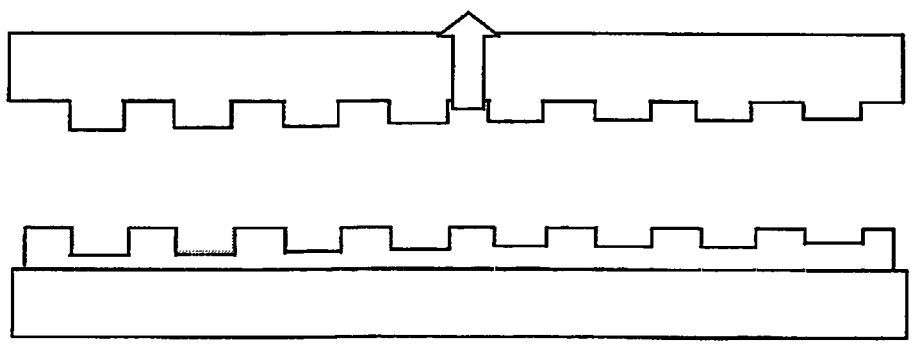

FIG. 10A through 10C are cross-sectional views illustrating a process of transcribing a grating pattern.

In the step shown in FIG. 10A, a light-transmittive and thermal elastic resin 46 is applied on a substrate 45.

The resin 46 is pressed against the mold 40, and the surface of the resin 46 is heated to a melting temperature that is slightly higher than a resin Tg temperature, for example, the glass transition temperature of a resin of a high transmittance, such as CYTOP, is 108° C., and is 105 to 120° C. for PMMA.

In the step shown in FIG. 10B, the heated resin 46 is pressed on the mold 40 and pressure is applied. Afterward, the resin 46 is gradually cooled after the resin 46 is shaped based on the mold 40 for shape transcription.

In the step shown in FIG. 10C, the resin 46 is released from the mold 40.

Following the steps in FIGS. 9A through 9E and FIGS. 10A through 10C, the diffraction grating can be produced.

In the present embodiment, along with transcription of the diffraction grating to the optical device, another grating may be formed on the other surface of the optical device. In doing so, in an optical product or an optical pickup, which includes the above optical device, specifically, includes at least one of a wave plate, polarized-light optical element, aperture limitation element, aberration correction element, and a phase shifter, the number of parts can be reduced, and the fabrication cost and size of the device can be reduced.

According to the present embodiment, it is possible to realize a compatible optical pickup for recording, reproducing or erasing data in both a blue-light optical recording medium A, which uses light of wavelength 405 nm, has a numerical aperture NA 0.85, and a substrate thickness of 0.1 mm on the incidence side; and a blue-light optical recording medium B, which uses light of wavelength 405 nm, has a numerical aperture NA 0.65, and a substrate thickness of 0.6 mm on the incidence side.

Second Embodiment

In the present embodiment, an optical pickup is able to record, reproduce or erase data in a blue-light optical recording medium A, which uses light of wavelength 405 nm, having a numerical aperture NA 0.85, and having a substrate thickness of 0.1 mm on the incidence side; and is able to record, reproduce or erase data in a blue-light optical recording medium B, which uses light of wavelength 405 nm, has a numerical aperture NA 0.65, and a substrate thickness of 0.6 mm on the incidence side. Furthermore, the optical pickup is able to record, reproduce or erase data in a DVD optical recording medium C, which uses light of wavelength 660 nm, having a numerical aperture NA 0.65, and having a substrate thickness of 0.6 mm on the incidence side; and a CD optical recording medium D, which uses light of wavelength 785 nm, has a numerical aperture NA 0.50, and a substrate thickness of 1.2 mm on the incidence side.

Figure 11:
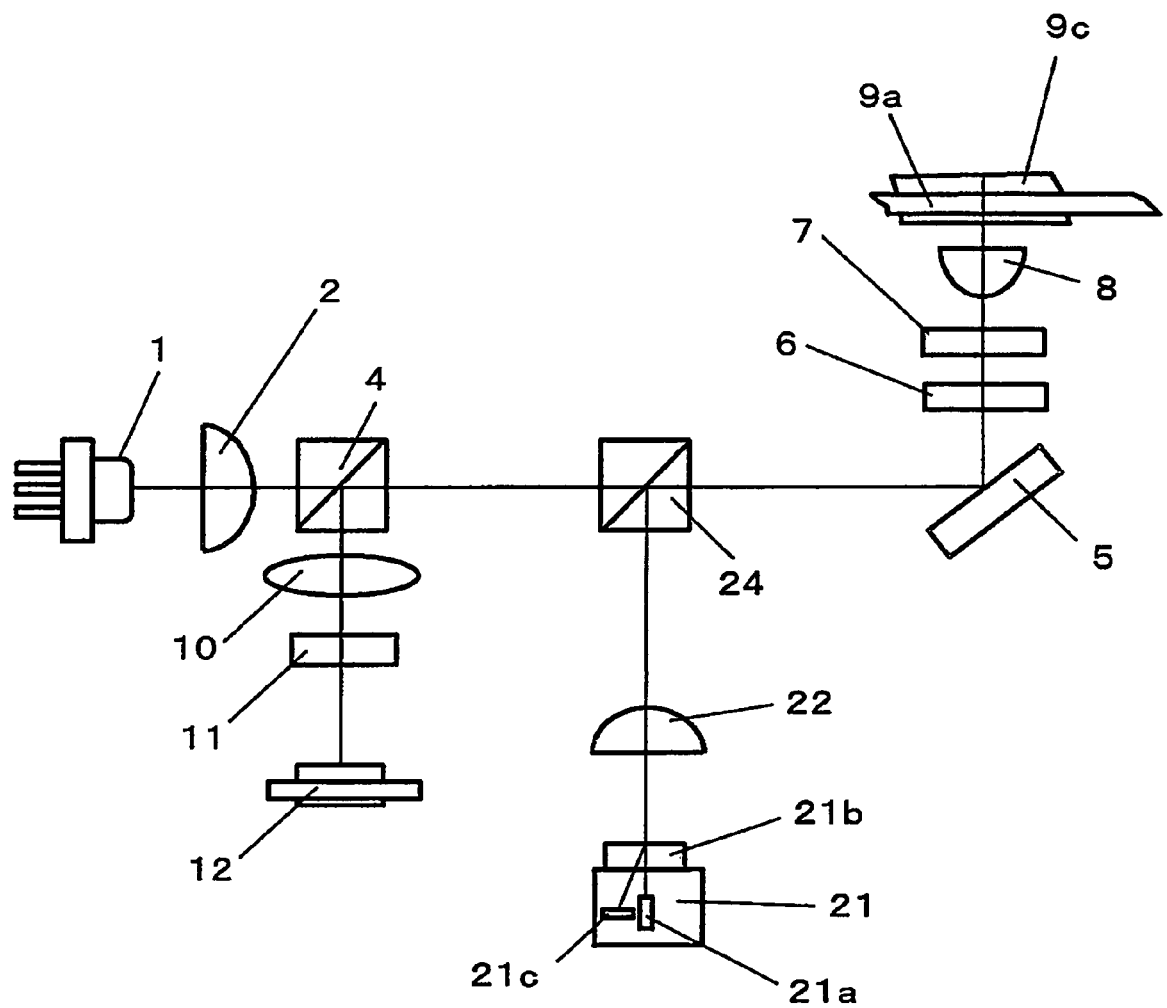
FIG. 11 is a schematic view illustrating an optical pickup according to a second embodiment of the present invention.

FIG. 11 is a schematic view illustrating an optical pickup according to a second embodiment of the present invention, which is configured to record, reproduce or erase data in a blue-light optical recording medium A, which uses light of wavelength 405 nm, having a numerical aperture NA 0.85, and having a substrate thickness of 0.1 mm on the incidence side; and a DVD optical recording medium C, which uses light of wavelength 660 nm, having a numerical aperture NA 0.65, and having a substrate thickness of 0.6 mm on the incidence side.

A principal portion of the optical pickup illustrated in FIG. 11 includes a blue light optical system and a DVD optical system. The blue light optical system is for processing a light beam of wavelength 405 nm, including a blue-light semiconductor laser 1 emitting a light beam of wavelength 405 nm, a collimator lens 2, a half mirror 4, a dichroic prism 24, a deflection prism 5, a polarized light selective aperture limitation element 6, a polarized light selective aberration correction element 7, an object lens 8, a detection lens 10, a light beam divider 11, and a light receiving element 12.

The DVD optical system is for processing a light beam of wavelength 660 nm, including a hologram unit 21, a collimator lens 22, a dichroic prism 24, the deflection prism 5, the polarized light selective aperture limitation element 6, the polarized light selective aberration correction element 7, and the object lens 8.

The object lens 8 is designed such that for a light beam incident on the blue light optical recording medium A (wavelength: 405 nm, numerical aperture: NA=0.85, substrate thickness on the incidence side: 0.1 mm) in parallel, the wave front aberration is minimum. Such a parallel incidence system is also referred to as "infinite incidence system".

Generally, when the numerical aperture NA of an object lens is higher, a better tolerance is required. In the present example, compared to the numerical aperture NA=0.65, it is relatively difficult to obtain desired properties with the numerical aperture NA=0.85; hence, it is preferable to use a non-spherical lens of a numerical aperture NA=0.85 with aberration being corrected.

In addition, the polarization direction of the light from the blue-light semiconductor laser 1 is perpendicular to the polarization direction of the light from the hologram unit 21 for DVD use, and the systems are arranged so that the light beam to be focused on the DVD is diffracted by the polarized light selective aperture limitation element 6 and the polarized light selective aberration correction element 7, and the blue light beam to be focused on the blue light optical recording medium A passes through non-sensitive regions of the polarized light selective aperture limitation element 6 and the polarized light selective aberration correction element 7.

Below, a description is made of operations of recording or reproducing data in the optical recording medium 9a, that is, the blue light optical recording medium A related to a wavelength of 405 nm, numerical aperture of NA=0.85, and a substrate thickness of 0.1 mm on the incidence side.

A linearly-polarized and divergent light beam having a wavelength of 405 nm is emitted from the semiconductor laser 1. This linearly-polarized and divergent light beam is converted into a substantially parallel beam in the collimator lens 2, passes through the half mirror 4 and the dichroic prism 24, and the light path of the light beam is deflected by 90 degrees in the deflection prism 5. Then, the light beam passes through non-sensitive regions of the polarized light selective aperture limitation element 6 and the polarized light selective aberration correction element 7, is incident on the object lens 8, and is condensed on the optical recording medium 9a to be a fine spot. With this spot, data recording, reproduction, or erasure in the optical recording medium 9a is performed.

The light beam reflected from the optical recording medium 9a is reflected by the half mirror 4. The reflected light beam is focused by the detection lens 10, divided into plural divisional light beams in the light beam divider 11 along different light paths, and arrives at the light receiving element 12. The light receiving element 12 outputs information signals and servo signals.

Below, a description is made of operations of recording or reproducing data in the optical recording medium 9c, that is, the DVD optical recording medium C related to a wavelength of 660 nm, numerical aperture of NA=0.65, and a substrate thickness of 0.6 mm on the incidence side.

In recent years and continuing, in an optical pickup for DVD use, a hologram unit is widely used in which a light emission source and a light receiving element are provided in the same can, and a hologram is used to separate a light beam. The hologram unit 21 is an integration of a semiconductor laser chip 21a, a hologram 21b, and a light receiving element 21c.

A light beam having a wavelength of 660 nm is emitted from the semiconductor laser 21a in the hologram unit 21, and this light beam is converted into a substantially parallel beam by the collimator lens 22. The dichroic prism 24 has a characteristic of allowing a light beam in the blue wavelength region to pass through, and reflecting a light beam in the red wavelength region. Hence, the incident light beam is deflected to the deflection prism 5 by the dichroic prism 24, and the light path of the light beam is deflected by 90 degrees in the deflection prism 5.

Then, the numerical aperture of the light beam is limited to be NA=0.65 in the polarized light selective aperture limitation element 6, and is diffracted to a divergent light beam in the polarized light selective aberration correction element 7. Then, this light beam is incident on the object lens 8, and is condensed on the optical recording medium 9c to be a fine spot. With this spot, data recording, reproduction, or erasure in the optical recording medium 9c is performed.

The light beam reflected from the optical recording medium 9c is reflected by the deflection prism 5 and by the dichroic prism 24, and is focused by collimator lens 22. By the hologram 21b, the light beam is diffracted to the light receiving element 21c in the same can with the semiconductor laser 21a, and is detected by the light receiving element 21c. The light receiving element 21c outputs information signals and servo signals.

In the present embodiment, the same as the blue-light optical recording media A, B described in the preceding embodiments, the optical pickup is a compatible device which is able to record, reproduce or erase data in all of the blue-light optical recording medium A, the DVD optical recording medium C, and the CD optical recording medium C.

Figure 12A:
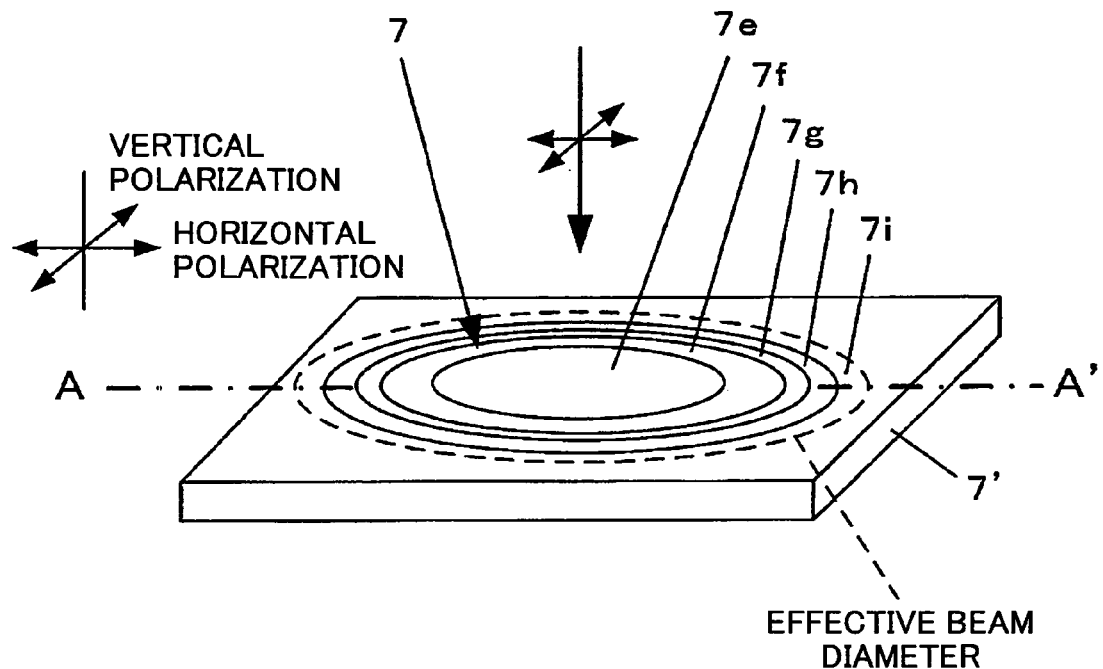
FIG. 12A is a perspective view of an aberration correction element using a polarized light phase shifter according to the present embodiment.
Figure 12B:
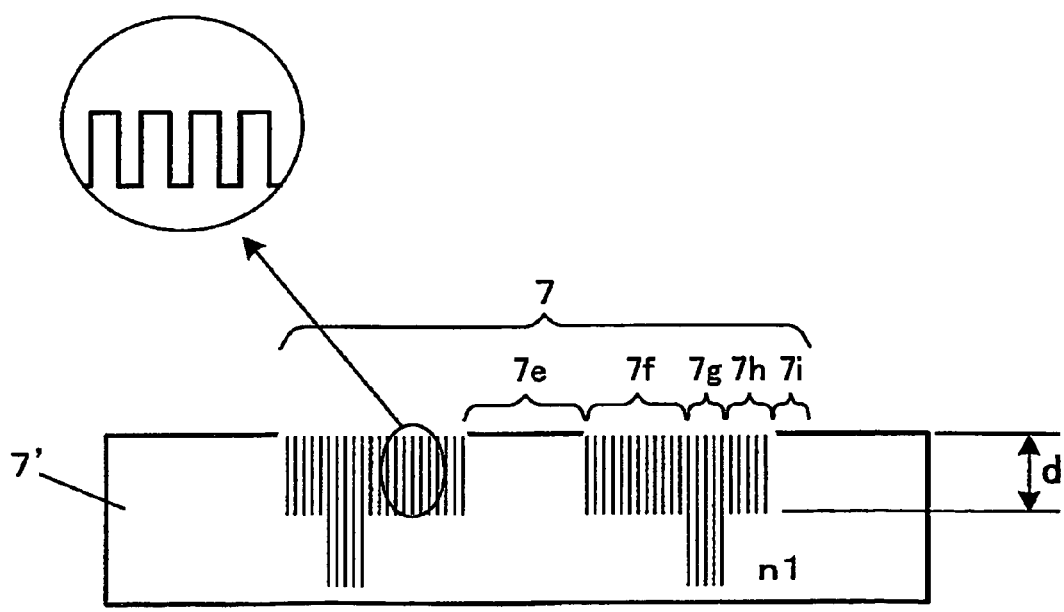
FIG. 12B is a cross-sectional view of the aberration correction element along the line AA' in FIG. 12A.

FIG. 12A is a perspective view of an aberration correction element using a polarized light phase shifter according to the present embodiment, and FIG. 12B is a cross-sectional view of the aberration correction element along the line AA' in FIG. 12A.

The aberration correction element of the present embodiment is not limited to those utilizing diffraction as described in the first embodiment, but can also employ a correction method using zero-order light.

Below, a phase shifter utilizing polarized light selectivity by a sub-wavelength grating is taken as an example.

Further, the optical pickup in the present embodiment has the same configuration as that for recording, reproducing or erasing data in both the blue-light optical recording medium A and the blue-light optical recording medium B as illustrated in FIG. 1, and a phase shifter 7' is used as the aberration correction element.

Below, a description is made of the aberration correction element which utilizes the function of polarized light selective phase shifter.

When recording or reproducing data in the blue-light optical recording medium A, a light beam of a vertical polarization direction is incident and passes through the phase shifter 7', and when recording or reproducing data in the blue-light optical recording medium B, a light beam of a horizontal polarization direction is incident and passes through the phase shifter 7'.

As illustrated in FIGS. 12A and 12B, the phase shifter 7' includes concentric planar patterns 7e (first pattern) to 7i (fifth pattern) with the optical axis as a center, and each of the concentric planar patterns 7e to 7i has a step-like cross-section.

In each of the second pattern 7f to the fifth pattern 7i, a sub-wavelength diffraction grating is formed with fine pitches. If a phase difference between the light passing through the gratings of fine pitches and the light passing through regions other than the gratings of fine pitches is an integral multiple of $2\pi$, the incident light is not diffracted and all of the incident light is transmitted through the phase shifter 7'. If the phase difference is not an integral multiple of $2\pi$, there is no light directly passing through the phase shifter 7', and all components of the incident light are delayed corresponding to the phase differences, respectively, by the step-like portion of the grating. If the shape of the steps of the gratings causing the delay is set to be opposite to the polarity of the generated aberration to be corrected, it is possible to correct the generated aberration.

Below, a description is made of operations of the phase shifter when performing recording or reproduction with the blue-light optical recording medium B.

Assume that the height of the steps of the sub-wavelength grating is uniform, and indicated by d, the refractive index of the phase shifter is represented by n1, and the refractive index in the horizontal polarization direction of the incident light beam is represented by np, then, the light path length difference $\Delta L$ between every two neighboring regions is expressed by the following formula (13).

$$\Delta L = (np - n1)d \tag{13}$$

In other words, with $\lambda$ representing a wavelength, the phase difference $\delta$ can be expressed by the following formula (14).

$$\delta = (np - n1)\frac{2\pi d}{\lambda} \tag{14}$$

Figure 13B:
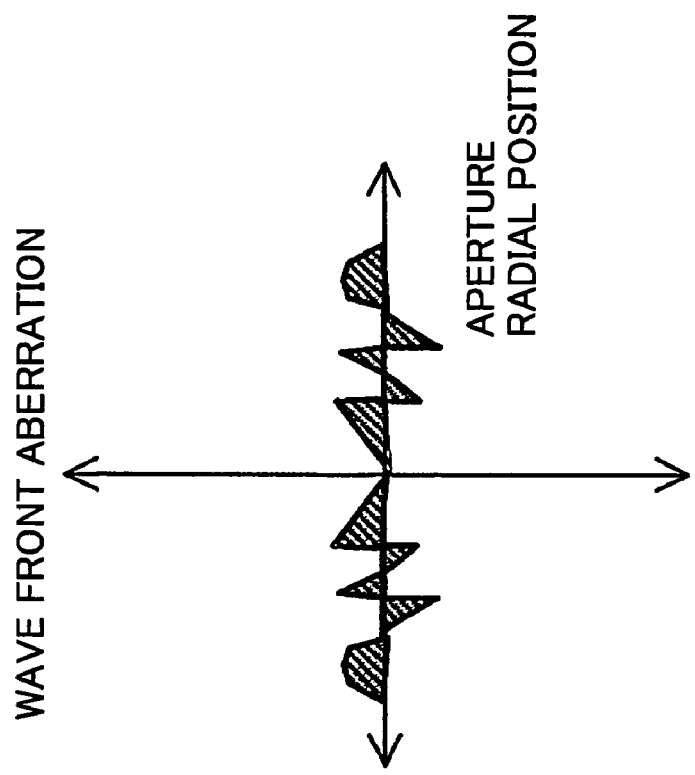
FIG. 13B shows the wave front aberration after correction.
Figure 13A:
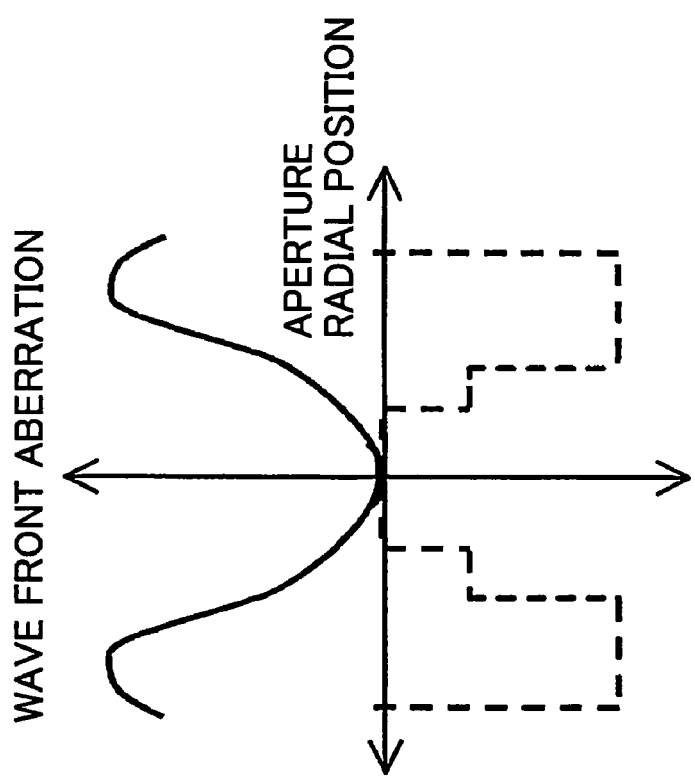
FIG. 13A shows the wave front aberration to be corrected.

FIG. 13A shows the wave front aberration to be corrected, and FIG. 13B shows the wave front aberration after correction.

In FIG. 13A, the solid line in the upper portion indicates the wave front aberration generated when condensing light on the blue-light optical recording medium B.

If a step-like phase is generated, as indicated by the dashed line in the lower portion, and is added to the incident beam from the light source to the object lens, it is possible to cancel out the wave front aberration caused by delay of the wave front in the light beam passing through the phase shifter, which is for correcting the aberration.

FIG. 13B shows a sum of the solid line (wave front aberration) and the dashed line (wave front delay due to the phase shifter) in FIG. 13A, that is, the wave front aberration after correction. As shown in FIG. 13B, the wave front aberration after correction is much smaller than the original aberration.

On the other hand, when recording or reproducing data in the blue-light optical recording medium A, because the phase shifter does not work, and the light beam passes through the phase shifter without diffraction, the phase difference $\delta$ generated in the phase shifter is an integral multiple of $2\pi$, as expressed by the following formula (15).

$$\delta = (ns - n1)\frac{2\pi d}{\lambda} = 2m\pi \tag{15}$$

In the present embodiment, the phase shifter and the aforesaid aperture limitation element described in the first embodiment may be integrated together. For example, as illustrated in FIG. 12A, concentric planar patterns 7e (first pattern) to 7i (fifth pattern) with the optical axis as a center constitute a phase shifter, and an aperture limitation element may be provided in the peripheral region thereof; thereby, the phase shifter and the aperture limitation element are formed on the same plane.

Third Embodiment

Figure 14:
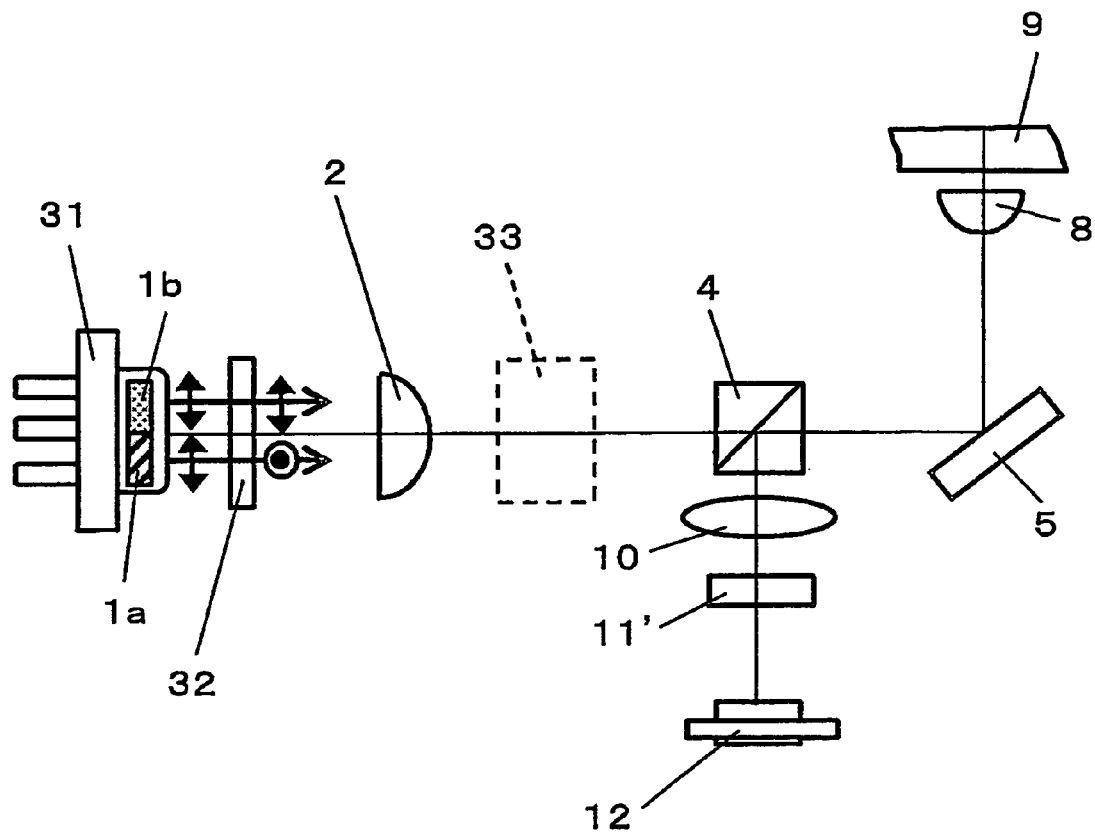
FIG. 14 is a schematic view illustrating an optical pickup according to a third embodiment of the present invention.

FIG. 14 is a schematic view illustrating an optical pickup according to a third embodiment of the present invention.

The optical pickup illustrated in FIG. 14 is a multi-beam optical pickup having a light source array including two channels. Below, a description is made of a sub-wavelength grating functioning as a wave plate, with a polarization direction switching element in the multi-beam optical pickup as an example.

A principal portion of the multi-beam optical pickup illustrated in FIG. 14 includes light source unit 31, a collimator lens 2, a two-beam light path combination element 33, a half mirror 4, a deflection prism 5, an object lens 8, a detection lens 10, a light beam deflection element 11', and a light receiving element 12.

With the multi-beam optical pickup, it is possible to increase operating speed by recording or reproducing two tracks at the same time. Alternatively, with one light beam to perform recording, and with the other light beam to perform verification, it is possible to maintain high reliability. Further, with one light beam to perform recording, reproduction or erasure on a blue-light optical recording medium A, and with the other light beam to perform recording, reproduction or erasure on a DVD optical recording medium or a CD optical recording medium, or with one light beam to perform recording, reproduction or erasure on a DVD optical recording medium, and with the other light beam to operate recording, reproduction or erasure on a CD optical recording medium, it is possible to make the optical pickup compact.

The light source unit 31 includes a semiconductor laser chip, and the semiconductor laser chip includes two light emission sources, for example, two light emission diodes, denoted as LD1a and LD1b. At the backward stage of the semiconductor laser chip, a polarization direction switching element 32 is arranged, the light beam from the LD1a passes through the sub-wavelength grating acting as a ½ wave plate, and the polarization direction thereof is rotated by 90 degrees, being perpendicular to the light beam from the LD2a and passing through the polarization direction switching element 32.

The light beam emitted from the light source unit 31 is converted into a substantially parallel beam in the collimator lens 2. Here, the incidence angles of the two light beams passing through the collimator lens 2 differ from each other. By using the two-beam light path combination element 33 described below for reducing the incidence angles, the deviations of the light beams from the optical axis of the object lens 8 can be reduced after the light beams are emitted from the collimator lens 2. Afterward, the light beams pass through the half mirror 4, and the light paths of the light beams are deflected by 90 degrees in the deflection prism 5. Then, the light beam is condensed on the optical recording medium 9 by the object lens 8.

The light beam reflected from the optical recording medium 9a propagates back along the incidence light path, that is, it is reflected by the half mirror 4, and arrives at a light beam deflection element 11'. The light beam deflection element 11' transmits or reflects or diffracts the light beam reflected from the optical recording medium 9a according to the polarization rotation angle, and directs all light beams to the same light receiving element 12. The light receiving element 12 is appropriately divided into plural divisions according to the methods of generating servo signals.

Based on the light beam reflected from the optical recording medium 9a, the light receiving element 12 outputs tracking signals, focus signals, and reproduction signals to a subsequent later stage circuit (not illustrated).

Generally, if the light beam incident on the object lens 8 is inclined relative to the optical axis of the object lens 8, the quality of the spot formed on the disk surface cannot be maintained due to wave front degradation. Especially, the degradation increases when NA of the object lens 8 a large.

Figure 15:
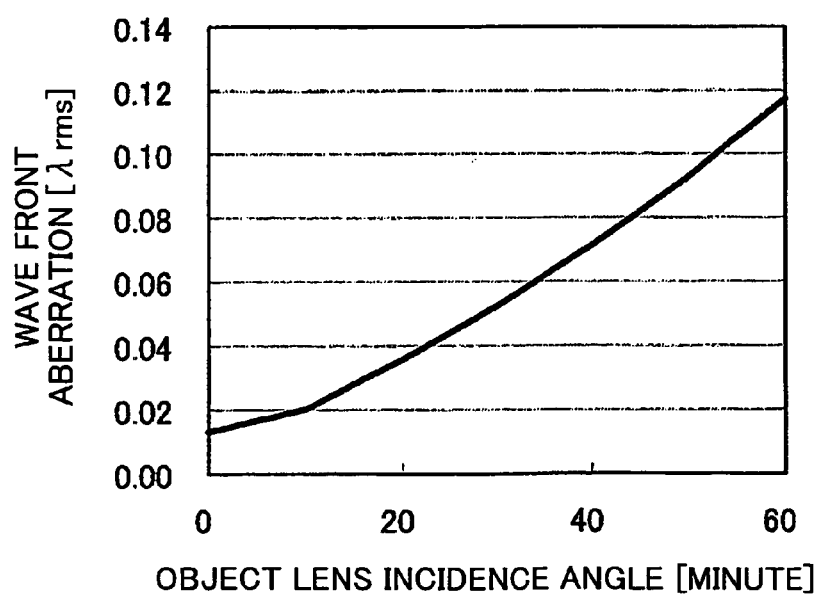
FIG. 15 shows calculation results of a relation between an incidence angle relative to the object lens and the wave front aberration.

FIG. 15 shows calculation results of a relation between an incidence angle relative to the object lens and the wave front aberration.

In the present embodiment, the two-beam light path combination element 33 is provided between the collimator lens 2 and the object lens 8 to reduce angular differences of the light beams relative to the optical axis of the object lens 8, the light beams being from the collimator lens 2 and emitted from the laser diodes LD1a and LD1b.

It should be noted that although it is possible to reduce the angular difference of two light beams by shortening the interval between two laser diodes, because of difficulties in fabrication and thermal interference between the two laser diodes, generally, the interval between LD1a and LD1b is set to be a few tens μm.

According to the multi-beam optical pickup of the present embodiment, because of the polarization direction switching element 32, the polarization planes of the two light beams emitted from the light source unit 31 can be set to be perpendicular to each other; hence, elements capable of polarized-light selection can be used as the two-beam light path combination element 33.

Figure 16A:
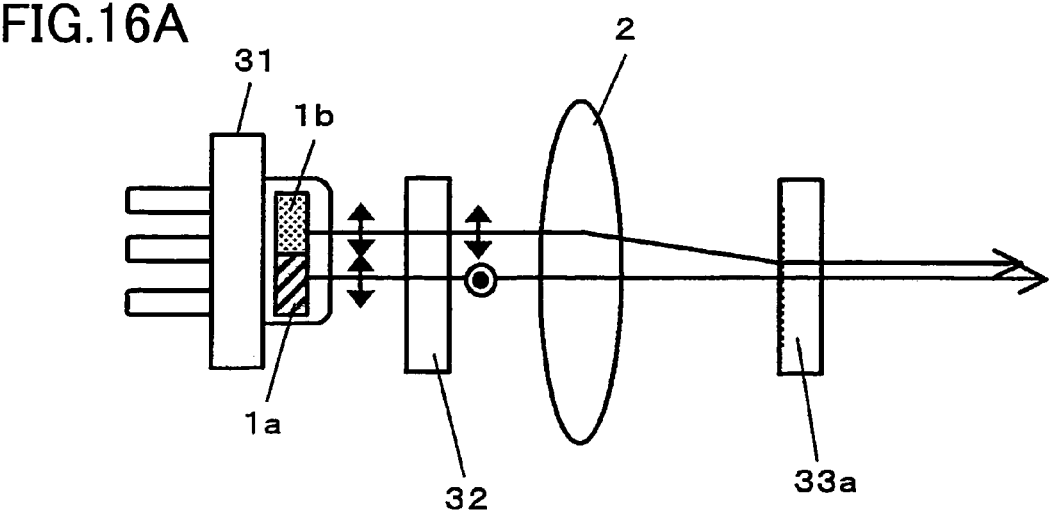
FIG. 16A through FIG. 16C illustrate examples of the two-beam light path combination element.
Figure 16B:
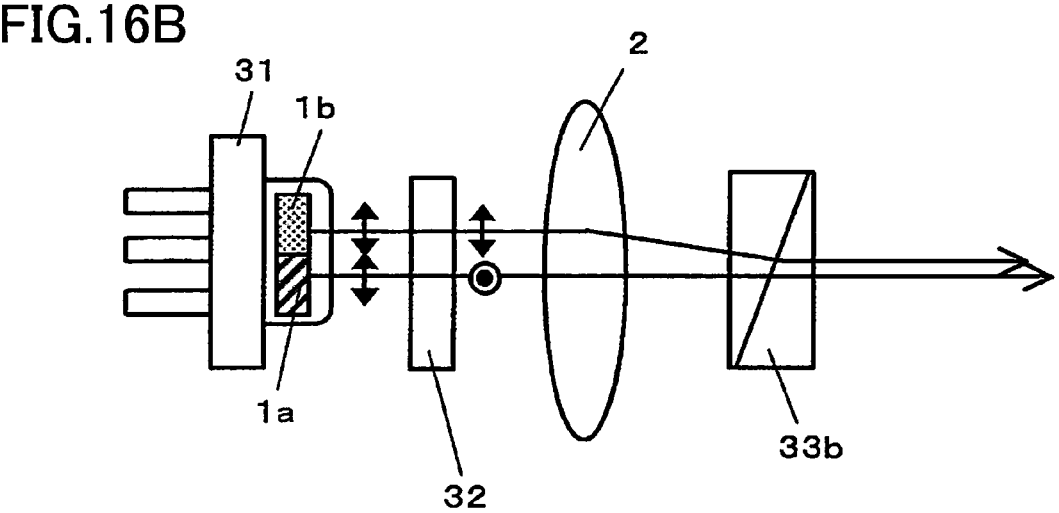
Figure 16C:
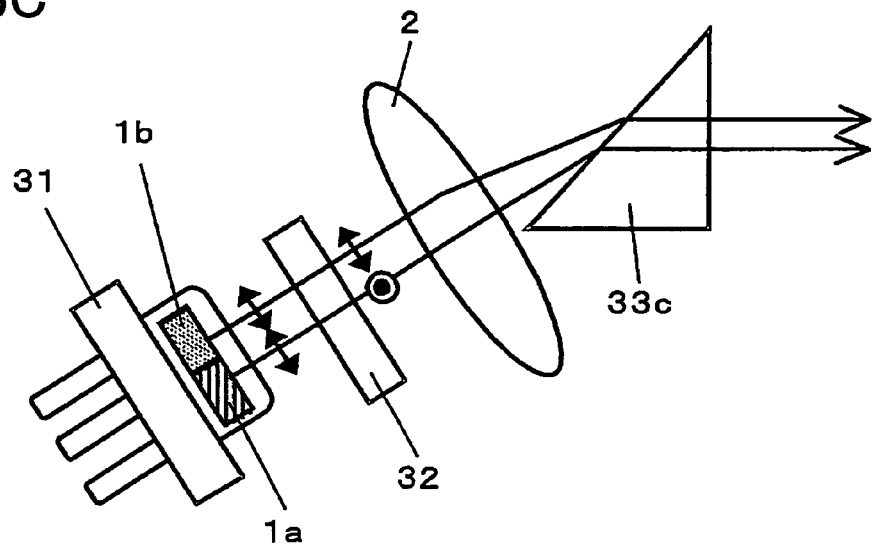

FIG. 16A through FIG. 16C illustrate examples of the two-beam light path combination element 33.

As illustrated in FIG. 16A, the two-beam light path combination element 33 may also be formed from a polarization hologram, which is used as a polarization selection unit, or from a Wollaston prism, as illustrated in FIG. 16B. Further, a beam shaping prism as illustrated in FIG. 16C, which is used for converting an elliptical beam into a nearly circular beam, may also be as the two-beam light path combination element 33.

In addition, according to the multi-beam optical pickup of the present embodiment, because of the polarization direction switching element 32, the polarization planes of the two light beams emitted from the light source unit 31 can be set to be perpendicular to each other; hence, in these light beams, among the light beams reflected from the optical recording medium 9, the light beam for recording and the light beam for reproduction can be directed to the same light receiving element 12 by the light beam deflection element 11', according to the difference of the polarization planes. Therefore, it is not necessary to provide respective light receiving elements for recording and reproduction.

Figure 17A:
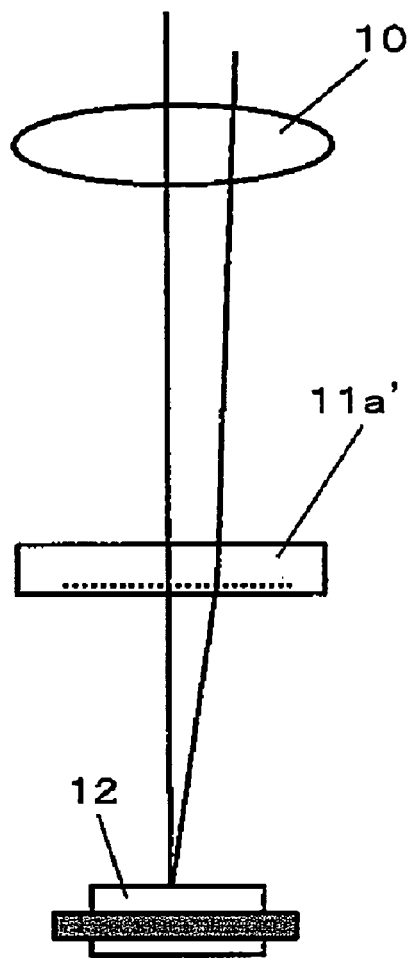
FIG. 17A and FIG. 17B illustrate examples of the light beam deflection element.
Figure 17B:
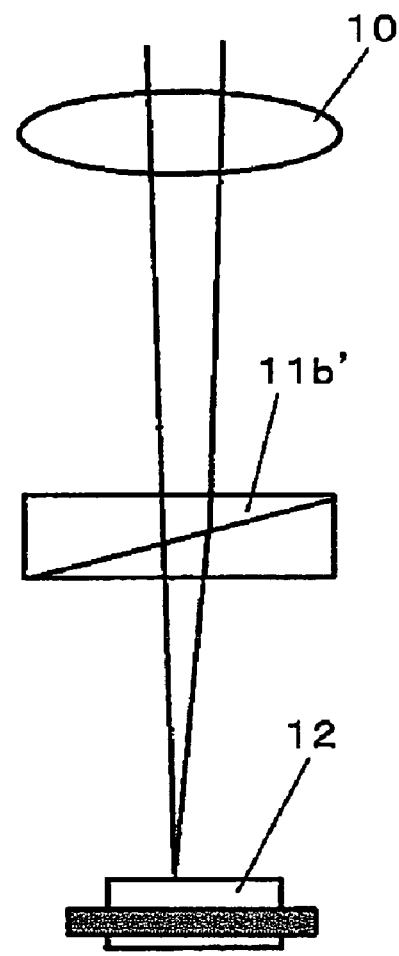

FIG. 17A and FIG. 17B illustrate examples of the light beam deflection element 11'.

As illustrated in FIG. 17A, the light beam deflection element 11' may be formed from a polarization hologram, or from a Wollaston prism as illustrated in FIG. 17B.

Figure 18A:
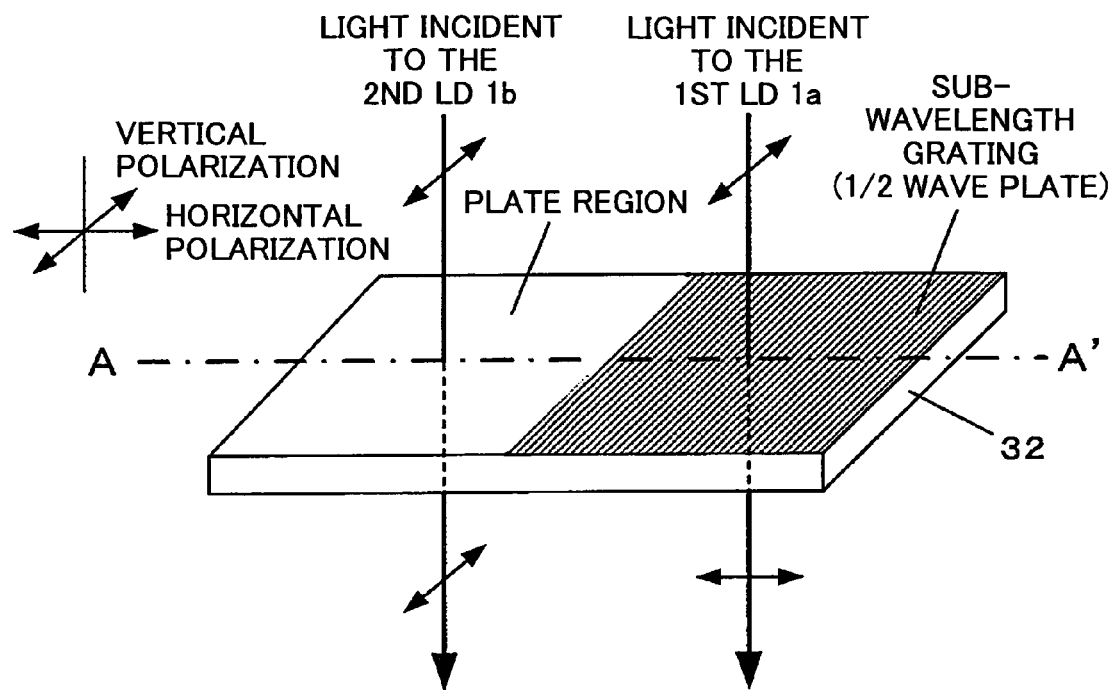
FIG. 18A is a perspective view of a polarization direction switching element using functions of a wave plate of a sub-wavelength grating according to the present embodiment.
Figure 18B:
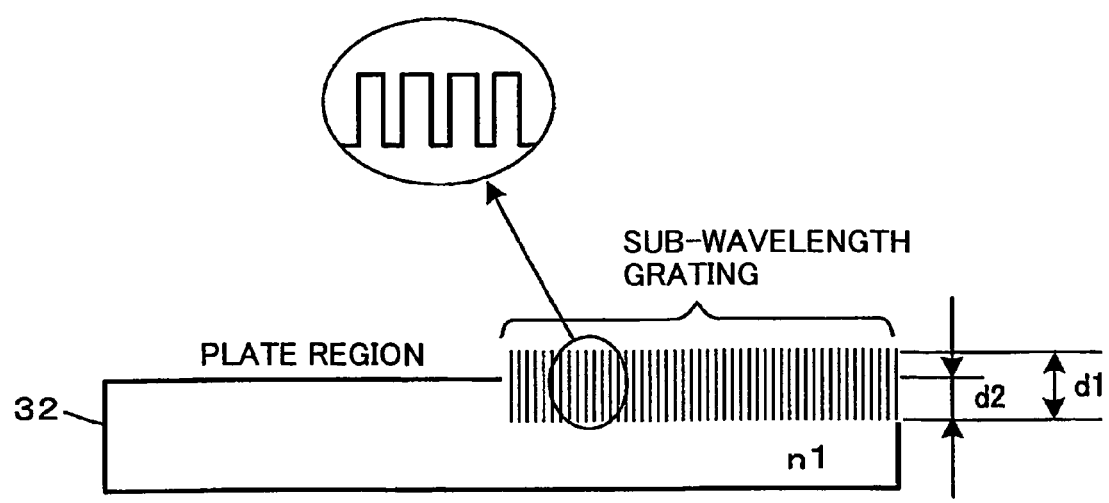
FIG. 18B is a cross-sectional view of the polarization direction switching element along the line AA' in FIG. 18A.

FIG. 18A is a perspective view of a polarization direction switching element using functions of a wave plate given by a sub-wavelength grating as described above, according to the present embodiment, and FIG. 18B is a cross-sectional view of the polarization direction switching element along the line AA' in FIG. 18A.

In a wave plate using the sub-wavelength grating as illustrated in FIG. 18A, the sub-wavelength grating produces anisotropy, and the phase difference δ corresponding to the anisotropy can be expressed by the following formula (16), $$\delta = \frac{2\pi d1}{\lambda}(n1-1) \tag{16}$$

where λ represents the wavelength of the incident light, n1 represents a refractive index of the medium, and d1 represents a height of the grating.

By appropriately selecting the refractive index of the medium n1, and the height of the grating d1, this phase difference can be set to be π or π/2 thereby realizing various kinds of wave plates.

Below, a description is made of the polarization direction switching element using functions of a wave plate given by a sub-wavelength grating.

As illustrated in FIG. 18A, the surface of the polarization direction switching element 32 is equally divided into two parts, and in one of the two parts, a sub-wavelength grating is formed, and in the other one of the two parts, a sub-wavelength grating is not formed, that is, it is merely a plate.

The light beam from LDa of the light source unit 31 passes through the sub-wavelength grating and the light beam from LD1b of the light source unit 31 passes through the region without the sub-wavelength grating.

In order that the light beam from LD1a of the light source unit 31 passes through the sub-wavelength grating without diffraction, it is sufficient to set the phase difference in the sub-wavelength grating to be an integral multiple of 2π.

In addition, in order that the aberration is not generated, it is preferable that the light path lengths from the light sources LD1a and LD1b to the collimator lens 2 be approximately the same. If the light path length from LD1a to the collimator lens 2 is different from the light path length from LD1b to the collimator lens 2, this difference induces an aberration related to a defocus error of the collimator lens 2.

The light path length L1 of the light beam passing through the sub-wavelength grating can be expressed by the following formula (17).

$$L1 = \left(\frac{ns+np}{2}+1\right)\frac{d1}{2} \tag{17}$$

It is sufficient to set the path length L1 to be the same as the light path length L2 of the light beam from the light source LD1b and passing through the region where the sub-wavelength grating is not formed.

The light path length L2 is given by the following formula (18).

$$L2 = n1 d2 \tag{18}$$

Fourth Embodiment

Figure 19:
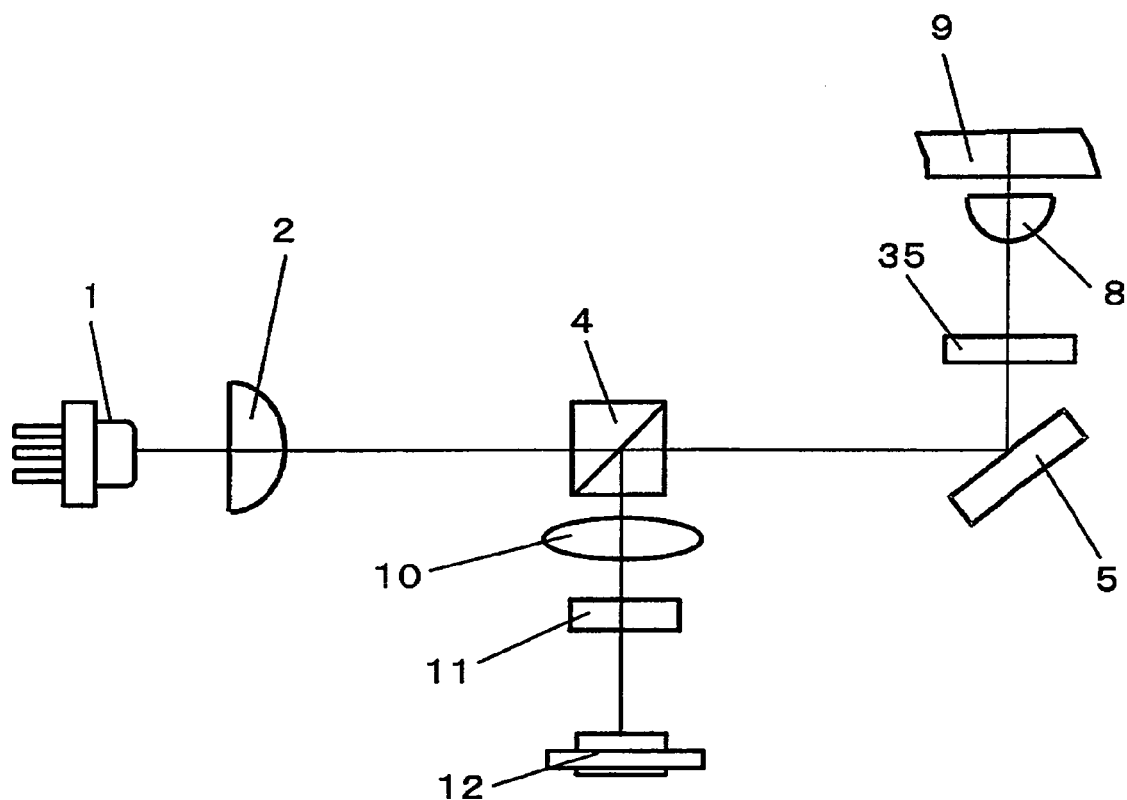
FIG. 19 is a schematic view illustrating an optical pickup according to a fourth embodiment of the present invention.

FIG. 19 is a schematic view illustrating an optical pickup according to a fourth embodiment of the present invention.

A principal portion of the optical pickup illustrated in FIG. 19 includes a semiconductor laser 1 acting as a light source unit, a collimator lens 2, a half mirror 4, a deflection prism 5, a super high resolution element 35, an object lens 8, a detection lens 10, a light beam divider 11, and a light receiving element 12.

In the present embodiment, different from the third embodiment, the wave plate function may be provided in any portion of the light path. For example, a super high resolution element may be used. As is well known, the super high resolution element enables high density by reducing the size of the light beam.

In the optical pickup as illustrated in FIG. 19, a linearly-polarized and divergent light beam is emitted from the semiconductor laser 1, and this linearly-polarized and divergent light beam is converted into a substantially parallel beam in the collimator lens 2. Then the light beam passes through the half mirror 4, and the light path of the light beam is deflected by 90 degrees in the deflection prism 5. Then, a portion of the light beam near the optical axis is shielded by the super high resolution element 35, the laser beam without the portion near the optical axis is incident on the object lens 8, and is condensed on the optical recording medium 9 to be a fine spot.

Because of the super high resolution effect originating from light shielding of the portion of the light beam near the optical axis, the light spot has a much smaller size compared to the case when the super high resolution element 35 is not provided.

The light beam reflected from the optical recording medium 9 is converted into a substantially parallel light beam again, and is reflected by the half mirror 4. The reflected light beam is focused by the detection lens 10, divided into plural divisional light beams in the light beam divider 11 along different light paths, and arrives at the light receiving element 12. The light receiving element 12 outputs information signals and servo signals.

Figure 20A:
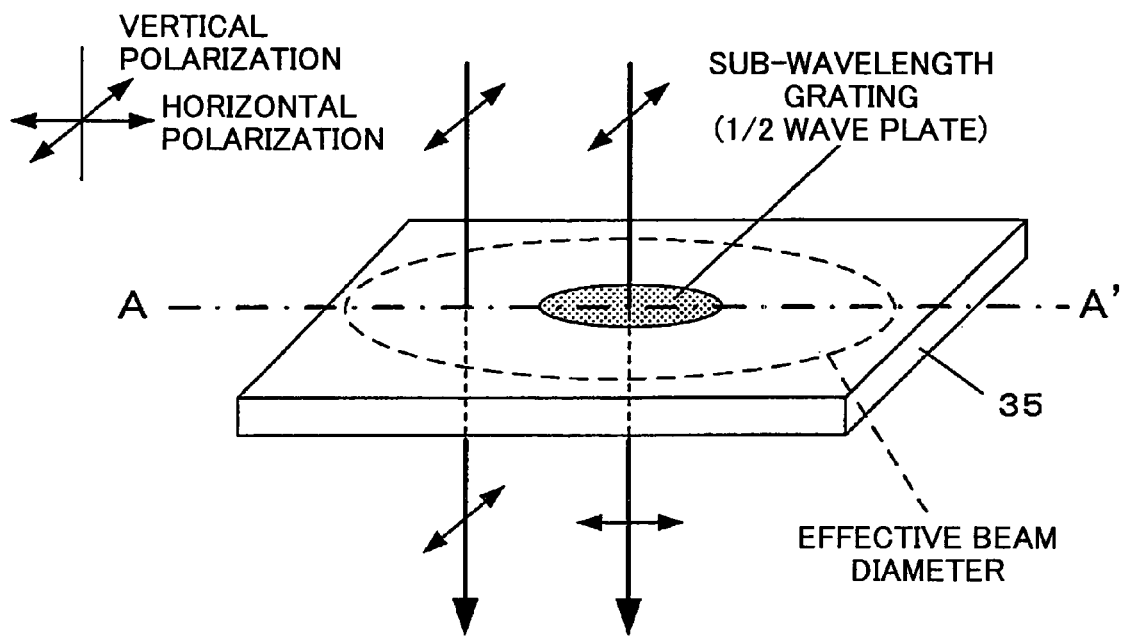
FIG. 20A is a perspective view of a super high resolution element functioning as a polarization direction switching element according to the present embodiment.
Figure 20B:
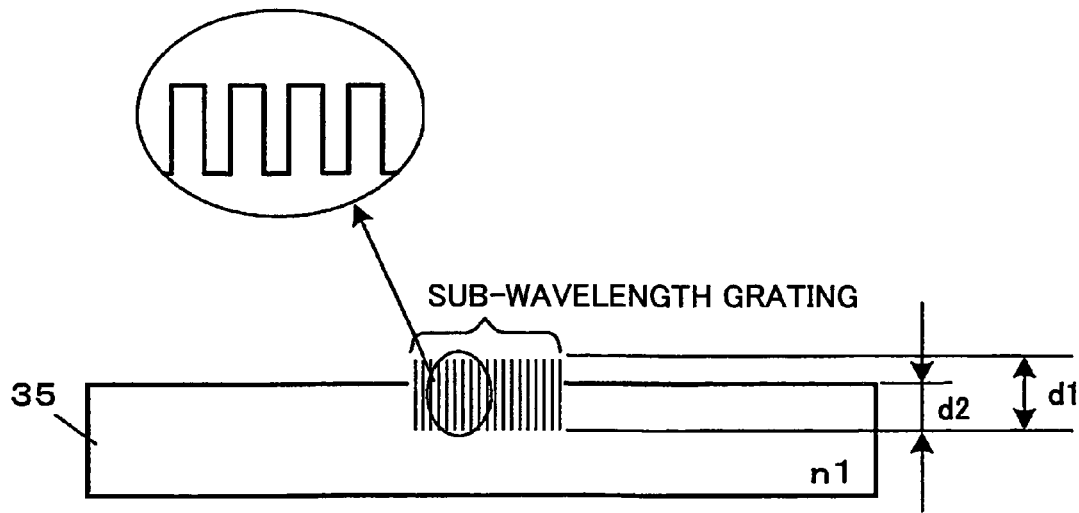
FIG. 20B is a cross-sectional view of the super high resolution element 35 along the line AA' in FIG. 20A.

FIG. 20A is a perspective view of the super high resolution element 35 functioning as a polarization direction switching element according to the present embodiment, and FIG. 20B is a cross-sectional view of the super high resolution element 35 along the line AA' in FIG. 20A.

As illustrated in FIG. 20A, a sub-wavelength grating is formed in a region near the optical axis, and a not-illustrated polarization filter is uniformly formed on the opposite side to the sub-wavelength grating. As in the third embodiment, the sub-wavelength grating functions as a ½ wave plate, which rotates the polarization direction of the light beam passing through the sub-wavelength grating by 90 degrees. The polarization filter is arranged to shield the light beam passing through the sub-wavelength grating, that is, the light beam whose polarization direction is rotated by 90 degrees in the sub-wavelength grating. Because the sub-wavelength grating is provided near the optical axis, the polarization filter is able to shield only the portion of the light beam near the optical axis.

The light-shielding area is not limited to a circular shape, but may be other shapes.

Figure 21:
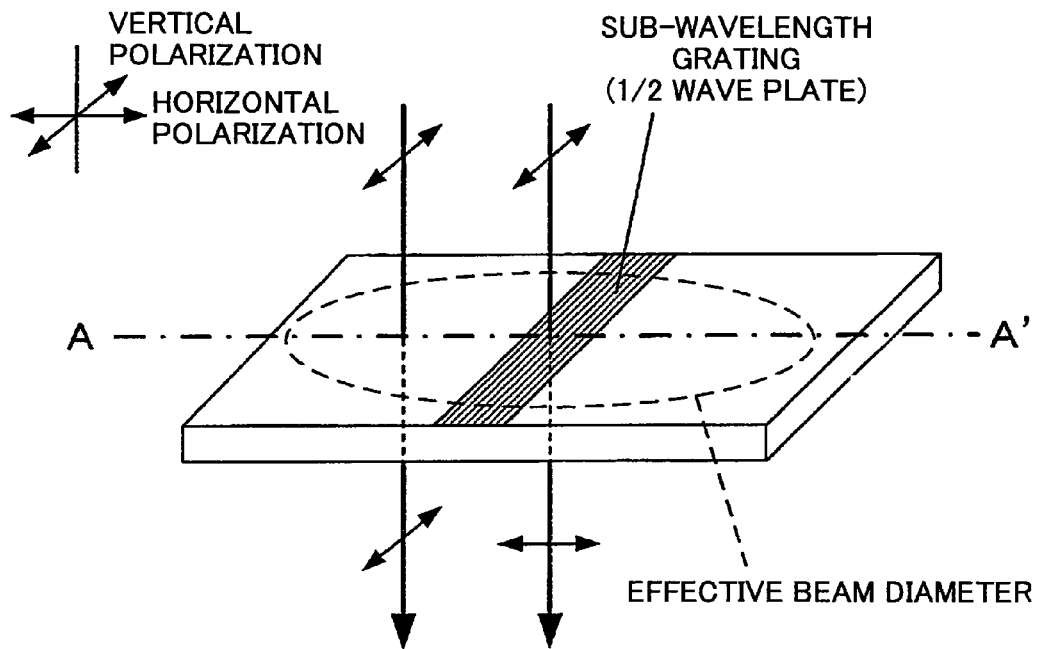
FIG. 21 is a perspective view of the super high resolution element illustrating an example of the light-shielding area.

FIG. 21 is a perspective view of the super high resolution element 35 illustrating an example of the light-shielding area.

As illustrated in FIG. 21, the light-shielding area may include multiple rectangular slices.

Figure 22:
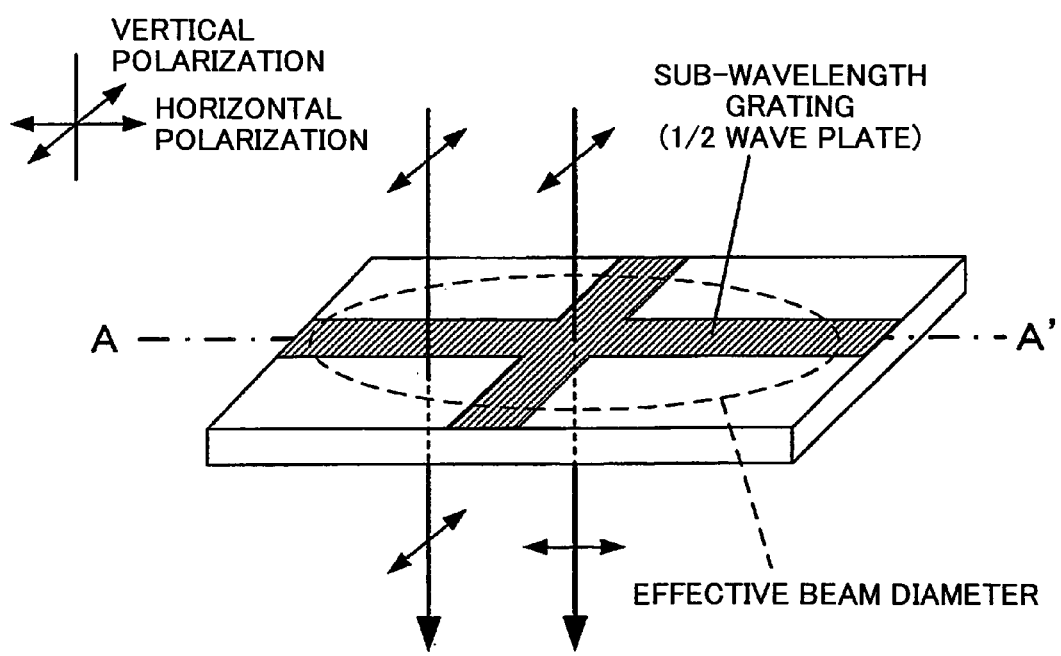
FIG. 22 is a perspective view of the super high resolution element illustrating another example of the light-shielding area.

FIG. 22 is a perspective view of the super high resolution element 35 illustrating another example of the light-shielding area.

As illustrated in FIG. 22, the light-shielding area may also be of a cross shape.

As mentioned in previous embodiments, because the phase difference between the light-shielding region and the non-light-shielding region may cause undesired aberration, it is preferable to adopt a structure without the phase difference, as in the third embodiment. Namely, the light path length L1 of a light beam through the sub-wavelength grating can be expressed by the following formula (19).

$$L1 = \left(\frac{ns + np}{2} + 1\right)\frac{d1}{2} \quad (19)$$

It is preferable that the light path length L1 be the same as the light path length L2 of the light beam passing through the region without the sub-wavelength grating. The light path length L2 is given by the following formula (20).

$$L2 = n1d2 \quad (20)$$

Fifth Embodiment

Figure 23:
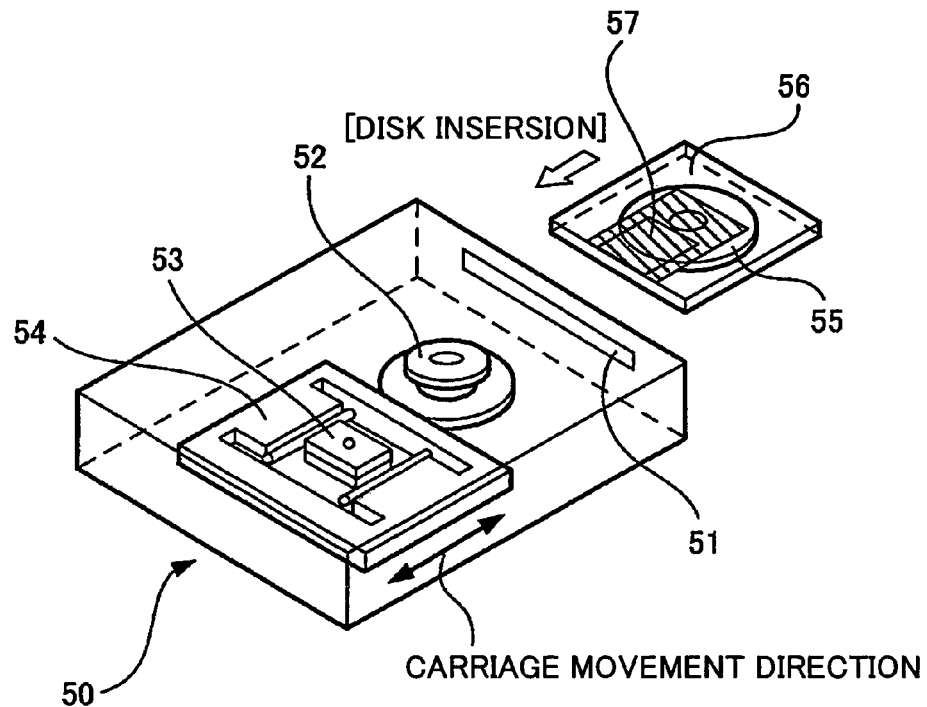
FIG. 23 is a perspective view schematically illustrating an optical information processing device according to a fifth embodiment of the present invention.

FIG. 23 is a perspective view schematically illustrating an optical information processing device according to a fifth embodiment of the present invention.

The optical information processing device 50 illustrated in FIG. 23 uses an optical pickup 53 to record, reproduce or erase data in an optical recording medium 55.

In the present embodiment, the optical recording medium 55 is a disk, and held in a carriage 56 acting as a protecting case. The optical recording medium 55, while being held in the carriage 56, is inserted into the optical information processing device 50 through an entrance 51 along an arrow "disk insertion". Then, the optical recording medium 55 is driven to rotate by a spindle motor 52, and the optical pickup 53 executes recording, reproduction or erasure of data in an optical recording medium 55. Of course, it is not always necessary to put the optical recording medium 55 in the carriage 56, and a bare optical recording medium 55 may be directly inserted into the optical information processing device 50.

The optical pickup 53 in the present embodiment may be any one of the optical pickups described in the previous embodiments.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

According to the present invention, in an optical device having polarized light diffraction functions realized by a sub-wavelength grating, and an optical pickup having such an optical device, a phase difference does not occur between a region where the sub-wavelength grating is formed and a region where the sub-wavelength grating is not formed, and due to this, undesirable wave front degradation does not happen. Therefore, it is possible to obtain an optical device having functions of aperture limitation for polarized light selection, aberration correction, phase shifter, or functions of a wave plate, and by incorporating these optical devices, it is possible to obtain an optical pickup of high compatibility, a multi-beam optical pickup, a super-high resolution optical pickup, and an optical information processing device using these optical pickups.

In addition, it is possible to obtain an optical device that can be fabricated without a surface coating process, enables plural parts to be shared, and enables reduction of the size and the cost.

This patent application is based on Japanese Priority Patent Applications No. 2004-060748 filed on Mar. 4, 2004 and No. 2004-309361 filed on Oct. 25, 2004, the entire contents of which are hereby incorporated by reference.

What is claimed is:

1. An optical device, comprising:
a sub-wavelength grating formed in at least one of a plurality of regions on a substrate with a refractive index of n1, wherein when an incident light beam with a predetermined polarization direction is used, the sub-wavelength grating has a refractive index indicated by the formula $$np = \sqrt{t(n1)^2 + (1-t)(n2)^2} \text{ or}$$

$$ns = \frac{1}{\sqrt{\frac{t}{(n1)^2} + \frac{1-t}{(n2)^2}}}$$

where n1, n2 represent refractive indexes of materials at tops and bottoms in the grating periodic structure, and the refractive index n1,
a grating height,
or a duty ratio t of said sub-wavelength grating are selected such that a light path of an incident first light beam passing through the sub-wavelength grating is the same as a light path of the first light beam passing through regions neighboring the at-least-one region, wherein the sub-wavelength grating is not formed in the neighboring regions.

2. The optical device as claimed in claim 1, wherein the sub-wavelength grating is superposed on a portion of a step-like surface, said surface having a plurality of steps, said portion including at least two steps.

3. The optical device as claimed in claim 2, wherein the sub-wavelength grating is superposed on a grating having a period longer than a wavelength of the first light beam.

4. The optical device as claimed in claim 3, wherein the sub-wavelength grating is formed in a annular ring region to diffract an incident second light beam, said second light beam being polarized and having a polarization direction perpendicular to the polarization direction of the first light beam.

5. The optical device as claimed in claim 3, wherein the sub-wavelength grating is formed in an inner portion of a annular ring region to diffract an incident second light beam, said second light beam being polarized and having a polarization direction perpendicular to the polarization direction of the first light beam.

6. The optical device as claimed in claim 3, wherein the sub-wavelength grating is formed in a annular ring region and in an inner portion of the annular ring region to enable portions of the sub-wavelength grating in the annular ring region and the inner portion of the annular ring region respectively to diffract an incident second light beam to two different directions, said second light beam being polarized and having a polarization direction perpendicular to the polarization direction of the first light beam.

7. The optical device as claimed in claim 2, wherein the sub-wavelength grating is formed in a plurality of concentric regions, and an incident second light beam has light paths of different lengths at different borders between each adjacent two of the concentric regions, said second light beam being polarized and having a polarization direction perpendicular to the polarization direction of the first light beam.

8. The optical device as claimed in claim 7, wherein the sub-wavelength grating is formed to have a plurality of concentric portions in an inner portion of a annular ring region capable of diffraction.

9. The optical device as claimed in claim 1, wherein the sub-wavelength grating functions as an m/2 (m is an integer) wave plate.

10. The optical device as claimed in claim 9, wherein
the sub-wavelength grating is formed in one of two regions obtained by symmetrically dividing a surface of the optical device, and
the sub-wavelength grating functions as a ½ wave plate relative to an incident second light beam, said second light beam being polarized and having a polarization direction perpendicular to the polarization direction of the first light beam.

11. The optical device as claimed in claim 9, wherein
the sub-wavelength grating is formed inside a circle including a center portion on a plane, or in a region having a plurality of rectangular slices, and
the sub-wavelength grating functions as a ½ wave plate relative to an incident second light beam, said second light beam being polarized and having a polarization direction perpendicular to the polarization direction of the first light beam.

12. An optical pickup for recording, reproducing or erasing data in at least two optical recording media having numerical apertures of NA1 and NA2 (NA1>NA2), respectively, said optical pickup comprising:
an optical device having a sub-wavelength grating, said sub-wavelength grating being formed in a annular ring region of a substrate with a refractive index indicated by $$np = \sqrt{t(n1)^2 + (1-t)(n2)^2} \text{ or}$$
$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure and t represents the duty ratio,
and wherein said sub-wavelength grating diffracts an incident second light beam of a polarization direction perpendicular to a predetermined polarization direction of a first light beam;
wherein in order to diffract a light beam which is incident only when recording, reproducing or erasing data in the optical recording medium having the numerical aperture of NA2, the annular ring region of the optical device is made to have diffraction functions to condense or scatter the light beam to a position different from a condensing point of the light beam passing through an inner portion of the annular ring region where the sub-wavelength grating is not formed.

13. An optical pickup for recording, reproducing or erasing data in a first optical recording medium which uses light of a wavelength λ1, has a numerical aperture of NA1, and has a substrate of a thickness t1, said optical pickup comprising:
an optical device having a sub-wavelength grating, said sub-wavelength grating being formed in an inner portion of a annular ring region and not formed in an outer portion of the annular ring region of a substrate with a refractive index indicated by $$np = \sqrt{t(n1)^2 + (1-t)(n2)^2} \text{ or}$$
$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure and t represents the duty ratio,
and wherein said sub-wavelength grating in the inner portion of the annular ring region diffracts an incident second light beam of a polarization direction perpendicular to a predetermined polarization direction of a first light beam;
wherein in order to diffract a light beam which is incident only when recording, reproducing or erasing data in a second optical recording medium which uses light of a wavelength λ2 (λ2≧λ1), has a numerical aperture of NA2 (NA2≧NA1), and has a substrate of a thickness t2 (t2≧t1), the inner portion of the annular ring region of the optical device is made to have diffraction functions to add an aberration having an opposite polarity to an aberration occurring when the light beam is condensed.

14. An optical pickup for recording, reproducing or erasing data in a first optical recording medium which uses light of a wavelength λ1, has a numerical aperture of NA1, and has a substrate of a thickness t1, said optical pickup comprising:
an optical device having a sub-wavelength grating, said sub-wavelength grating being formed in a plurality of concentric regions of a substrate with a refractive index indicated by $$np = \sqrt{t(n1)^2 + (1-t)(n2)^2} \text{ or}$$
$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure and t represents the duty ratio,
and wherein said optical device has an incident second light beam having different light path lengths at different borders between each adjacent two of the concentric regions, said second light beam being polarized and having a polarization direction perpendicular to a predetermined polarization direction of a first light beam;
wherein in order to generate different light path lengths of a light beam which is incident only when recording, reproducing or erasing data in a second optical recording medium which uses light of a wavelength λ2 (λ2≧λ1), has a numerical aperture of NA2 (NA2≧NA1), and has a substrate of a thickness t2 (t2≧t1), the concentric region of the optical device with the sub-wavelength grating is made to have phase-step functions to add an aberration having an opposite polarity to an aberration occurring when the light beam is condensed.

15. An optical pickup for condensing light beams from a two-channel array light source to record, reproduce or erase data in an optical recording medium, said optical pickup comprising:

an optical device having a sub-wavelength grating, said sub-wavelength grating being formed in only one of two regions of a substrate with a refractive index indicated by $$np = \sqrt{t(n1)^2 + (1-t)(n2)^2} \text{ or}$$

$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure and t represents the duty ratio, and wherein the one of two regions is obtained by symmetrically dividing a plane, and functioning as a ½ wave plate relative to an incident second light beam having a polarization direction perpendicular to a predetermined polarization direction of a first light beam;

wherein the two light beams output from the two-channel array light source are incident on the optical recording medium with the polarization directions of the two light beams being substantially perpendicular to each other.

16. An optical pickup, comprising:

an optical device having a sub-wavelength grating, said sub-wavelength grating being formed on substrate with a refractive index indicated by $$np = \sqrt{t(n1)^2 + (1-t)(n2)^2} \text{ or}$$

$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure and t represents the duty ratio, and wherein said sub-wavelength grating is formed inside a circle including a center portion on a plane, or in a region having a plurality of rectangular slices, said sub-wavelength grating functioning as a ½ wave plate relative to a second light beam having a polarization direction perpendicular to a polarization direction of a first light beam, said sub-wavelength grating being selected such that a light path of an incident light beam having a predetermined polarization direction in the sub-wavelength grating is the same as a light path of the incident light beam in neighboring regions without the sub-wavelength grating; and a polarization filter arranged between the optical device and an object lens;

wherein the polarization direction of a light beam incident on the optical device is set to be substantially perpendicular near an optical axis of the light beam, and a portion of a light beam incident on the object lens is filtered by the polarization filter to form a super high resolution beam spot on an optical recording medium.

17. An optical information processing device for recording, reproducing or erasing data in an optical recording medium, said optical information processing device comprising:

a sub-wavelength grating formed in at least one of a plurality of regions of a substrate, with a refractive index indicated by $$np = \sqrt{t(n1)^2 + (1-t)(n2)^2} \text{ or}$$

$$ns = \frac{1}{\sqrt{\frac{t}{(n1)^2} + \frac{1-t}{(n2)^2}}}$$

where n1, n2 represent the refractive indexes of materials at tops and bottoms in the grating periodic structure, and wherein, a refractive index, a grating height or a duty ratio t of said at least one sub-wavelength grating being selected such that a light path of an incident first light beam having a predetermined polarization direction in the sub-wavelength grating is the same as a light path of the first incident light beam in neighboring regions without the sub-wavelength grating.

* * * * *